US009516299B2

(12) United States Patent
Horimai et al.

(10) Patent No.: US 9,516,299 B2
(45) Date of Patent: Dec. 6, 2016

(54) THREE-DIMENSIONAL IMAGE PROJECTOR, THREE-DIMENSIONAL IMAGE PROJECTION METHOD, AND THREE-DIMENSIONAL IMAGE PROJECTION SYSTEM

(75) Inventors: Hideyoshi Horimai, Numazu (JP); Mitsuteru Inoue, Toyohashi (JP); Pang Boey Lim, Toyohashi (JP)

(73) Assignees: National University Corporation TOYOHASHI UNIVERSITY OF TECHNOLOGY, Toyohashi-shi (JP); HolyMine Corporation, Atsugi-shi (JP)

( * ) Notice: Subject to any disclaimer, the term of this patent is extended or adjusted under 35 U.S.C. 154(b) by 178 days.

(21) Appl. No.: 14/351,856

(22) PCT Filed: Sep. 13, 2012

(86) PCT No.: PCT/JP2012/073476
§ 371 (c)(1),
(2), (4) Date: Jul. 2, 2014

(87) PCT Pub. No.: WO2013/054634
PCT Pub. Date: Apr. 18, 2013

(65) Prior Publication Data
US 2014/0307064 A1    Oct. 16, 2014

(30) Foreign Application Priority Data
Oct. 14, 2011    (JP) ................ 2011-227030

(51) Int. Cl.
*G03B 21/14*    (2006.01)
*H04N 13/04*    (2006.01)
(Continued)

(52) U.S. Cl.
CPC ........ *H04N 13/0459* (2013.01); *G02B 5/0257* (2013.01); *G02B 27/2214* (2013.01);
(Continued)

(58) Field of Classification Search
CPC ... G02B 27/2214; G02B 5/0257; G03B 21/14; G03B 21/145; G03B 21/602; G03B 35/24; H04N 13/0459; H04N 13/0493
See application file for complete search history.

(56) References Cited

U.S. PATENT DOCUMENTS

2007/0146358 A1* 6/2007 Ijzerman ............ H04N 13/0404
345/419
2008/0123109 A1* 5/2008 Iwasaki ................ G06T 7/0057
356/610

FOREIGN PATENT DOCUMENTS

JP        05-066478        3/1993
JP        2006-047690 A    2/2006
(Continued)

OTHER PUBLICATIONS

Y. Aoki et al., "Directional light scanning 3-D display," Asia Communications and Photonics Conference and Exhibition (ACP), Nov. 2, 2009.
(Continued)

*Primary Examiner* — Sultan Chowdhury
*Assistant Examiner* — Magda Cruz
(74) *Attorney, Agent, or Firm* — Venable LLP; Michael A. Sartori; Laura G. Remus

(57) ABSTRACT

A three-dimensional image projector includes: a conversion optical system including a plate-shaped first optical member that has an incidence surface is incident, and an emission surface and that converts a traveling direction of the image light so as to form a predetermined angle between the emission surface and an emission direction of the image light on the emission surface; a rotary driving unit that drives the conversion optical system so as to rotate along the emission surface with a predetermined point on the emission surface as the center of rotation; and an image projection unit that is erected along a rotation axis, converts the traveling direction of the image light emitted from the
(Continued)

conversion optical system into a first direction along a surface crossing the rotation axis, and diffuses the image light emitted from the conversion optical system in a second direction along the rotation axis.

15 Claims, 21 Drawing Sheets

(51) Int. Cl.
  *G02B 5/02* (2006.01)
  *G02B 27/22* (2006.01)
  *G03B 21/602* (2014.01)
  *G03B 35/24* (2006.01)
(52) U.S. Cl.
  CPC ........... *G03B 21/14* (2013.01); *G03B 21/145* (2013.01); *G03B 21/602* (2013.01); *G03B 35/24* (2013.01); *H04N 13/0493* (2013.01)

(56) References Cited

FOREIGN PATENT DOCUMENTS

| | | |
|---|---|---|
| JP | 2006-133455 A | 5/2006 |
| JP | 2007-304248 A | 11/2007 |
| JP | 2009-222787 A | 10/2009 |
| JP | 2012-128898 A | 7/2012 |
| WO | WO-2009/113618 A1 | 9/2009 |

OTHER PUBLICATIONS

International Search Report in PCT International Application No. PCT/JP2012/073476, dated Oct. 23, 2012.
International Preliminary Report on Patentability and Written Opinion in PCT International Application No. PCT/JP2012/073476, dated Apr. 24, 2014.

* cited by examiner

THREE-DIMENSIONAL IMAGE PROJECTOR, THREE-DIMENSIONAL IMAGE PROJECTION METHOD, AND THREE-DIMENSIONAL IMAGE PROJECTION SYSTEM

TECHNICAL FIELD

The present invention relates to a three-dimensional image projector, a three-dimensional image projection method, and a three-dimensional image projection system to project a three-dimensional image.

BACKGROUND ART

Conventionally, in order to display a high-reality image, an image display system for displaying a three-dimensional image of an object in space has been developed. As an example of such a system, Patent Literature 1 discloses a three-dimensional image projector that projects an image in a direction set in advance at the time of recording of a hologram. The three-dimensional image projector displays a three-dimensional image having high reproducibility according to a change in the position of the viewer.

CITATION LIST

Patent Literature

[Patent Literature 1] Japanese Unexamined Patent Application Publication No. 2009-222787

SUMMARY OF INVENTION

Technical Problem

However, the three-dimensional image projector disclosed in Patent Literature 1 displays a three-dimensional image in a spatial region formed by rotating the image light emitted in a predetermined direction. Accordingly, the region where the three-dimensional image is displayed tends to be limited.

Therefore, the present invention has been made in view of the relevant problem, and an object of the present invention is to provide a three-dimensional image projector, a three-dimensional image projection method, and a three-dimensional image projection system capable of easily extending a region where a three-dimensional image can be viewed.

Solution to Problem

A three-dimensional image projector of an aspect of the present invention includes a conversion optical system including a plate-shaped first optical member that has an incidence surface, on which image light is incident, and an emission surface, which is located on an opposite side of the incidence surface, and that converts a traveling direction of the image light so as to form a predetermined angle between the emission surface and an emission direction of the image light on the emission surface; a rotary driving unit that drives the conversion optical system so as to rotate along the emission surface with a predetermined point on the emission surface as a center of rotation; and an image projection unit that is erected along a rotation axis including the center of rotation, converts the traveling direction of the image light emitted from the conversion optical system into a first direction along a surface crossing the rotation axis, and diffuses the image light emitted from the conversion optical system in a second direction along the rotation axis.

A three-dimensional image projection method of another aspect of the present invention is a method of acquiring a three-dimensional image by projecting image light to an image projection unit from a conversion optical system driven to rotate by a rotary driving unit. The three-dimensional image projection method includes: a division step of forming divided images by dividing each of a plurality of original images, which are obtained by changing a viewing point with respect to an object to different positions, along one direction of the original image; a selection step of selecting the divided images from the plurality of divided images based on a rotation angle of the conversion optical system and a position of the image light, which is projected to the image projection unit, in the image projection unit; a combination step of generating a projection image for generating the image light by combining the selected divided images; and a projection step of generating the image light projecting the projection image and projecting the image light to the image projection unit through the conversion optical system. In the projection step, the image light is emitted to the conversion optical system from an image light emission unit that emits the image light continuously in a form of a pulse. A traveling direction of the image light is converted by the conversion optical system that includes a plate-shaped optical member having an incidence surface, on which the image light is incident, and an emission surface, which is located on an opposite side of the incidence surface, and that converts the traveling direction of the image light so as to form a predetermined angle between the emission surface and an emission direction of the image light on the emission surface. The conversion optical system is driven to rotate along the emission surface with a predetermined point on the emission surface as a center of rotation. The image light is emitted to the image projection unit that is erected along a rotation axis including the center of rotation, converts the traveling direction of the image light emitted from the conversion optical system into a first direction along a surface crossing the rotation axis, and diffuses the image light emitted from the conversion optical system in a second direction along the rotation axis.

A three-dimensional image projection system of still another aspect of the present invention includes: an image generation unit that generates a projection image using a plurality of original images obtained by changing a viewing point with respect to an object to different positions; an image light emission unit that emits image light projecting the projection image continuously in a form of a pulse; a conversion optical system that includes a plate-shaped optical member having an incidence surface, on which the image light is incident, and an emission surface, which is located on an opposite side of the incidence surface, and that converts a traveling direction of the image light so as to form a predetermined angle between the emission surface and an emission direction of the image light on the emission surface; a rotary driving unit that drives the conversion optical system so as to rotate along the emission surface with a predetermined point on the emission surface as a center of rotation; and an image projection unit that is erected along a rotation axis including the center of rotation, converts the traveling direction of the image light emitted from the conversion optical system into a first direction along a surface crossing the rotation axis, and diffuses the image light emitted from the conversion optical system in a second direction along the rotation axis. The projection image is formed by a plurality of divided images obtained by dividing each of the original images along one direction of the original image, and the divided images are selected based on a rotation angle of the conversion optical system and a position of the image light, which is projected to the image projection unit, in the image projection unit.

According to this three-dimensional image projector, the three-dimensional image projection method, and the three-dimensional image projection system, the conversion optical system converts the traveling direction of image light. The conversion optical system rotates with a predetermined point as the center of rotation. For this reason, according to the rotation of the conversion optical system, the image light is projected to the image projection unit while scanning a region around the rotation axis. The image projection unit converts the traveling direction of the projected image light into the first direction. The first direction corresponds to a position on the image projection unit and the incidence angle to the position. For this reason, when the image light is projected while scanning the image projection unit, the image light is projected in different directions corresponding to the position on the image projection unit and the incidence angle to the position. Therefore, since it is possible to project an image according to the viewing point of the viewer, it is possible to display a three-dimensional image. Thus, by using the conversion optical system and the image projection unit, a three-dimensional image can be generated in a large region apart from the conversion optical system. In addition, the image projection unit diffuses the projected image light in one direction. Accordingly, a region where the three-dimensional image can be viewed can be extended in one direction. Therefore, it is possible to easily extend a region where the three-dimensional image can be viewed.

The image projection unit may include a diffraction grating. According to the image projection unit, a direction of only image light incident from a specific direction is converted into the first direction. For this reason, even if light is incident on the image projection unit from a direction other than the incidence direction of the image light, the direction of the light is not converted into light traveling in the first direction. Therefore, it is possible to suppress a reduction in the visibility of the three-dimensional image caused by the incidence of ambient light onto the image projection unit.

The image projection unit may include a reflection type hologram including a diffraction grating. According to the image projection unit, it is possible to suppress a reduction in the visibility of the three-dimensional image caused by the incidence of ambient light onto the image projection unit.

The image projection unit may include a transmission type hologram including a diffraction grating. According to this image projection unit, it is possible to suppress a reduction in the visibility of the three-dimensional image caused by the incidence of ambient light onto the image projection unit. In addition, according to the image projection unit, it is possible to display a three-dimensional image so as to overlap an object that is actually present.

The image projection unit may include a reflection plate that reflects the image light in the first direction and a diffusion plate that diffuses the image light in the second direction, and the reflection plate and the diffusion plate may be stacked. According to this configuration, the image projection unit can be easily formed.

The diffusion plate may be a lenticular lens including a plurality of cylindrical lenses. According to this configuration, it is possible to diffuse the image light in one direction.

The reflection plate may be provided on a lens surface of the diffusion plate. According to this configuration, it is possible to integrate the functions of the diffusion plate and the reflection plate.

The conversion optical system may further include a second optical member, and the second optical member may convert the image light into parallel light and emit the image light, which has been converted into the parallel light, to the incidence surface of the first optical member.

The conversion optical system may further include a third optical member, and the third optical member may emit the image light, which converges in a third direction, to the image projection unit. The third direction may be a direction along a surface perpendicular to the rotation axis, and may be a direction perpendicular to the emission direction on the emission surface of the first optical member. According to the conversion optical system, a difference in the distance from the conversion optical system to the image projection unit between the image light near the center and the image light near the end is reduced. Therefore, it is possible to suppress the occurrence of distortion of the three-dimensional image due to the difference in the distance from the conversion optical system to the image projection unit. The conversion optical system may be a transmission type hologram obtained by combining the functions of the first to third optical members. The conversion optical system may be a reflection type hologram obtained by combining the functions of the first to third optical members.

The image projection unit may have a shape curved in a direction perpendicular to the rotation axis. According to such a configuration, it is possible to extend the range where the image light is projected. In this case, it is possible to project the image light in a direction perpendicular to the direction in which the image light is diffused, that is, in a depth direction. Therefore, it is possible to further extend a region where the three-dimensional image can be viewed.

Advantageous Effects of Invention

According to the three-dimensional image projector, the three-dimensional image projection method, and three-dimensional image projection system of the present invention, a region where the three-dimensional image can be viewed can be easily extended.

DESCRIPTION OF EMBODIMENTS

Figure 1:
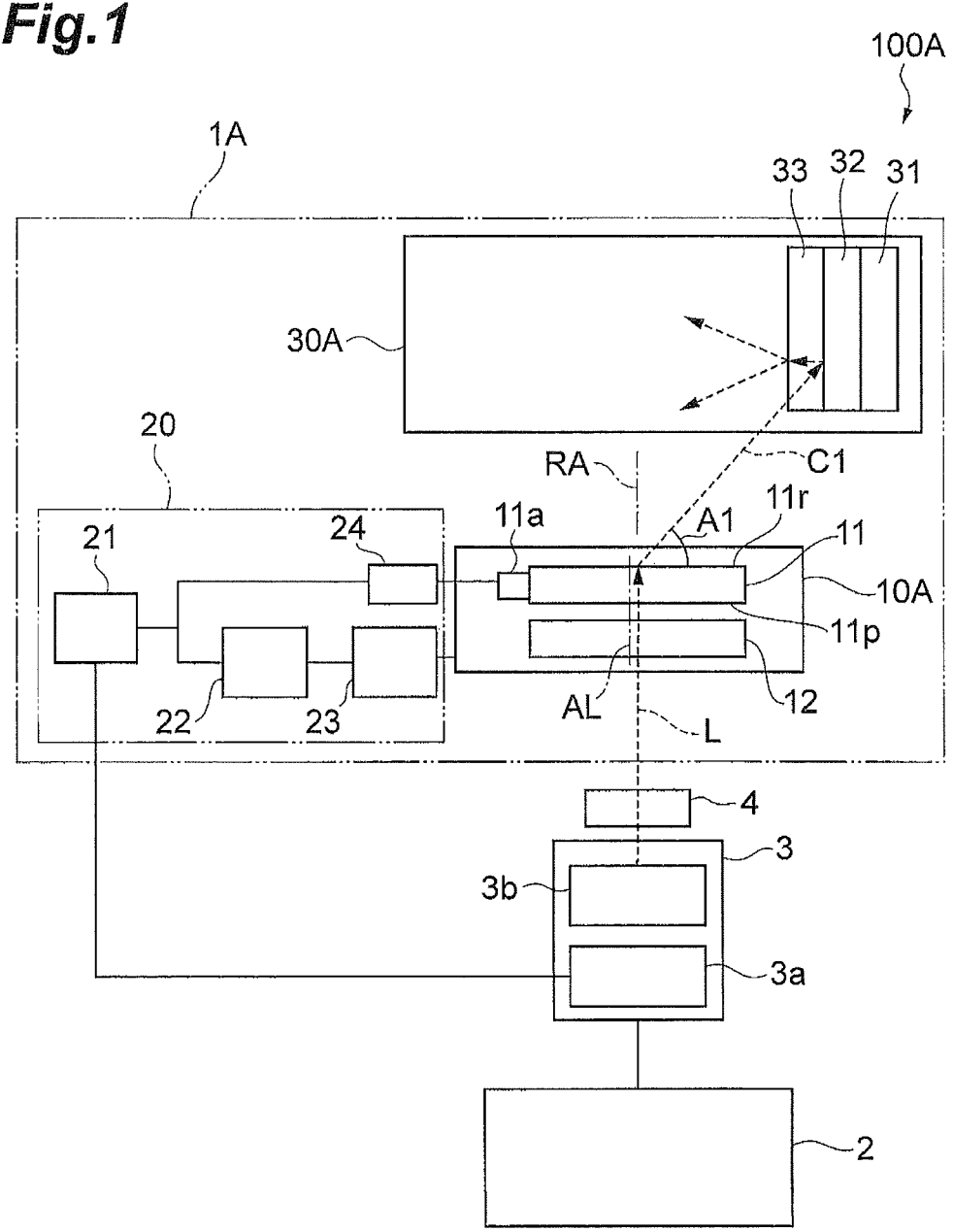
FIG. 1 is a block diagram for explaining the configuration of a three-dimensional image projection system including a three-dimensional image projector of a first embodiment.

Hereinafter, embodiments of a three-dimensional image projector, a three-dimensional image projection method, and a three-dimensional image projection system according to the present invention will be described in detail with reference to the accompanying diagrams. In addition, the same elements are denoted by the same reference numerals in the explanation of the diagrams, and repeated explanation thereof will be omitted.

First Embodiment

Figure 2:
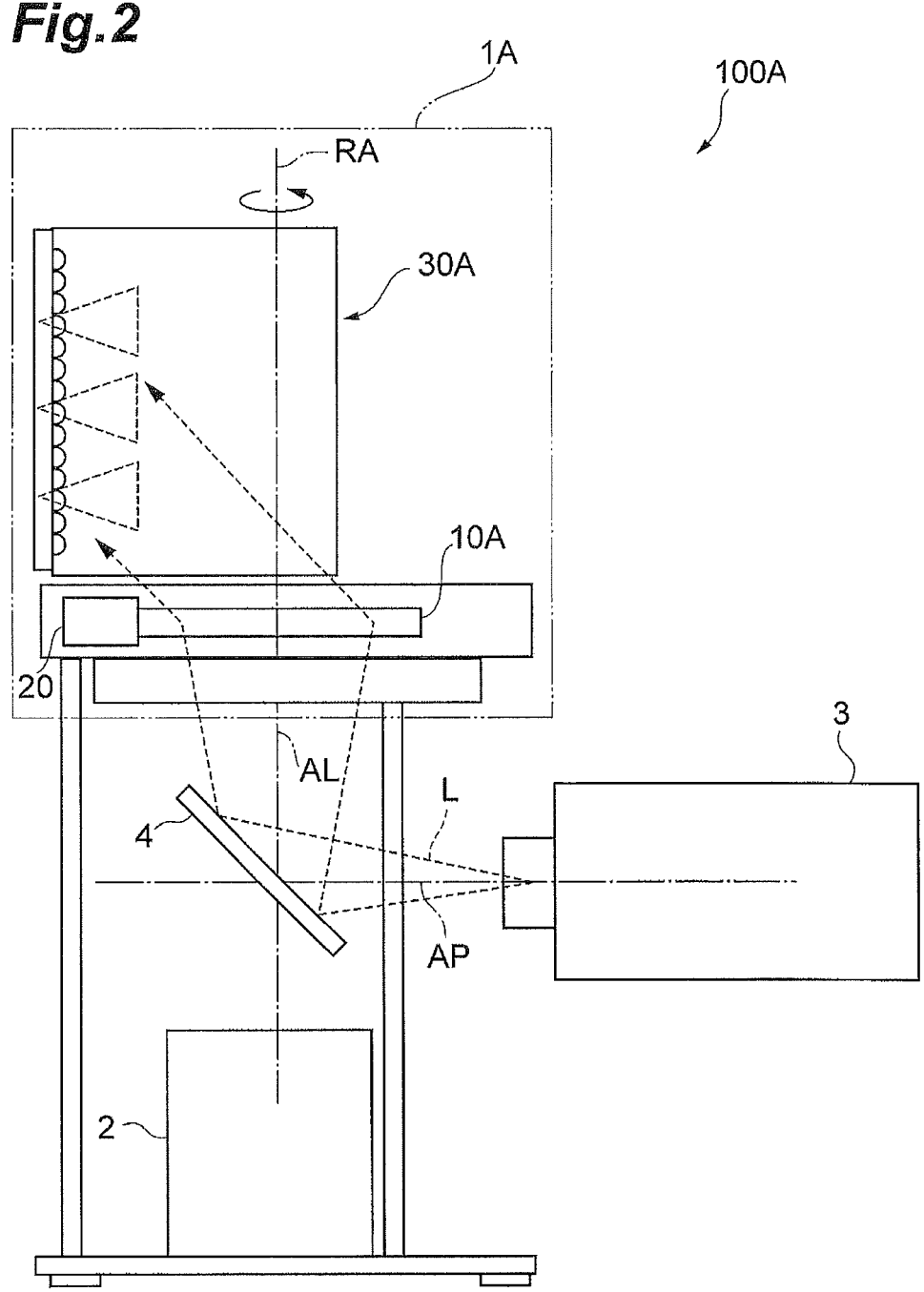
FIG. 2 is a configuration diagram for explaining the configuration of the three-dimensional image projection system shown in FIG. 1.

FIGS. 1 and 2 are diagrams for explaining the configuration of a three-dimensional image projection system 100A including a three-dimensional image projector 1A of a first embodiment. FIG. 1 is a block diagram for explaining the configuration of the three-dimensional image projection system 100A. FIG. 2 is a diagram for explaining the configuration of the three-dimensional image projection system 100A. As shown in FIGS. 1 and 2, the three-dimensional image projection system 100A includes the three-dimensional image projector 1A, an image generation unit 2, and an image light emission unit 3.

The image generation unit 2 generates a projection image. The projection image is an image projected by the image light emission unit 3. The image light is light projecting a projection image emitted from the image light emission unit 3. The process of generating a projection image will be described later. Although the position where the image generation unit 2 is disposed is not limited in particular, the image generation unit 2 is disposed below the three-dimensional image projector 1A in the first embodiment. As the image generation unit 2, for example, a computer including a data recording device, a working memory, and a CPU is used.

The image light emission unit 3 generates image light L, and emits the image light L toward the three-dimensional image projector 1A. The image light L is generated based on the projection image generated by the image generation unit 2. The image light emission unit 3 may be disposed below the three-dimensional image projector 1A. The image light emission unit 3 is disposed above the three-dimensional image projector 1A. The image light emission unit 3 includes a control unit 3a and a projector 3b.

Position data indicating the rotation angle, which will be described later, is sequentially input from the three-dimensional image projector 1A to the control unit 3a. The control unit 3a outputs a projection image to the projector 3b based on the position data.

The projector 3b generates the image light L based on the projection image, and emits the image light L toward the three-dimensional image projector 1A. As the projector 3b, a device capable of continuously emitting the image light L, which projects the projection image, in the form of a pulse is used. For example, it is possible to use a projector including a digital micromirror device (DMD) manufactured by Texas Instruments Inc. When generating a three-dimensional image by the three-dimensional image device 1, the image light L is projected whenever a conversion optical system 10A, which will be described later, is rotated by 0.7°, for example. When generating a moving image, the image light L of 30 frames per second is projected. Therefore, the projector 3b is configured to be able to project the image light L of at least 15000 frames per second.

The three-dimensional image projection system 100A includes a mirror 4 for optical axis adjustment. The mirror 4 guides the image light L, which is emitted from the image light emission unit 3, to the three-dimensional image projector 1A. The mirror 4 is disposed at a position where the optical axis AP of the projector 3b and the optical axis AL of the three-dimensional image projector 1A cross each other (refer to FIG. 2). Although the three-dimensional image projection system 100A includes the mirror 4, the three-dimensional image projection system 100A may not include the mirror 4. For example, in a three-dimensional image projection system that does not include the mirror 4, the image light emission unit 3 is disposed so that the optical axis AP of the projector 3b overlaps the optical axis AL of the three-dimensional image projector 1A.

The three-dimensional image projector 1A includes the conversion optical system 10A, a rotary driving unit 20, and an image projection unit 30A.

The conversion optical system 10A converts the traveling direction of the image light L emitted from the projector 3b. Since the conversion optical system 10A is configured so as to be rotatable by the rotary driving unit 20, the conversion optical system 10A shifts the image light L, of which the traveling direction has been converted, in the rotation direction and emits the image light L to the image projection unit 30A. The conversion optical system 10A includes a first optical member 11 and a second optical member 12. The first optical member 11 and the second optical member 12 are disposed in order of the second optical member 12 and the first optical member 11 from the image light emission unit 3 side.

The first optical member 11 is a deflection optical plate that converts the traveling direction of the image light L. The first optical member 11 has a disc shape allowing the image light L to be transmitted therethrough. The first optical member 11 has an incidence surface 11p and an emission surface 11r. The incidence surface 11p is a surface on which the image light L is incident. The emission surface 11r is an opposite side of the incidence surface 11p, and is a surface through which the image light L is emitted. The first optical member 11 converts the traveling direction of the image light L so that an emission direction C1 of the image light L on the emission surface 11r and the emission surface 11r form a predetermined angle A1. The predetermined angle is set based on the shape and size of the image projection unit 30A or the positional relationship between the image projection unit 30A and the conversion optical system 10A. In the first embodiment, the predetermined angle A1 is 68°.

In the first embodiment, the first optical member 11 is, for example, a linear prism plate capable of converting the traveling direction of the incident light into a predetermined direction. The linear prism plate is a plate-shaped optical member in which prisms are provided in parallel on the plane. In the linear prism plate, a pitch between the prisms is set to 1 mm or less. The pitch in the linear prism plate of the first embodiment is 0.3 mm.

The first optical member 11 may be formed by using one linear prism plate that can convert the traveling direction of the image light L by a predetermined angle, or may be formed by combining a plurality of linear prism plates. The first optical member 11 of the first embodiment is formed by using one linear prism plate that can convert the traveling direction of the image light L by 22°.

The first optical member 11 is driven to rotate by the rotary driving unit 20 with the center of the first optical member 11 as the center of rotation. As a result, the emission direction C1 of the image light L is shifted along the rotation direction.

The first optical member 11 has a rotation reference member 11a. The rotation reference member 11a is a reference for acquiring the rotation angle of the first optical member 11. The rotation reference member 11a is protruding portions disposed at equal intervals on the outer peripheral edge of the first optical member 11 having a disc shape, for example.

The second optical member 12 converts the image light L into parallel light. The second optical member 12 is disposed so as to be closer to the image light emission unit 3 than the first optical member 11 is along the optical axis AL of the incident image light of the three-dimensional image projector 1A. That is, the image light L is incident on the first optical member 11 after being transmitted through the second optical member 12. In the first embodiment, the second optical member 12 is a Fresnel lens that can convert light emitted from the focal point into parallel light. The Fresnel lens is a lens obtained by dividing the normal lens into parallel regions. Since the Fresnel lens has a plurality of lenses formed on the parallel straight line, it is possible to convert the image light L emitted from the focal point into parallel light. In the Fresnel lens of the first embodiment, for example, the external diameter is 300 mm, and the focal length is 600 mm. By using the Fresnel lens as the second optical member 12, it is possible to reduce the thickness of the second optical member 12.

The rotary driving unit 20 drives the conversion optical system 10A so as to rotate in one direction. The rotary driving unit 20 rotates the conversion optical system 10A along the emission surface 11r with the center on the emission surface 11r as a rotation axis RA. The rotary driving unit 20 includes a control board 21, a servo amplifier 22, a rotary driving mechanism 23, and an encoder 24.

The control board 21 outputs a driving signal to the servo amplifier 22. The control board 21 calculates the rotation angle of the first optical member 11 based on the value output from the encoder 24, which will be described later, and outputs position data indicating the rotation angle to the control unit 3a of the image light emission unit 3. The servo amplifier 22 drives the rotary driving mechanism 23 so as to rotate at the desired angular speed based on the driving signal output from the control board 21. The rotary driving mechanism 23 rotates the conversion optical system 10A at the desired angular speed by the supply of electric power from the outside. The rotary driving mechanism 23 can be realized by an electric motor, a belt drive, a gear, and the like. The encoder 24 acquires a value based on the rotation reference member 11a of the first optical member 11, and outputs the value to the control board 21.

Figure 3:
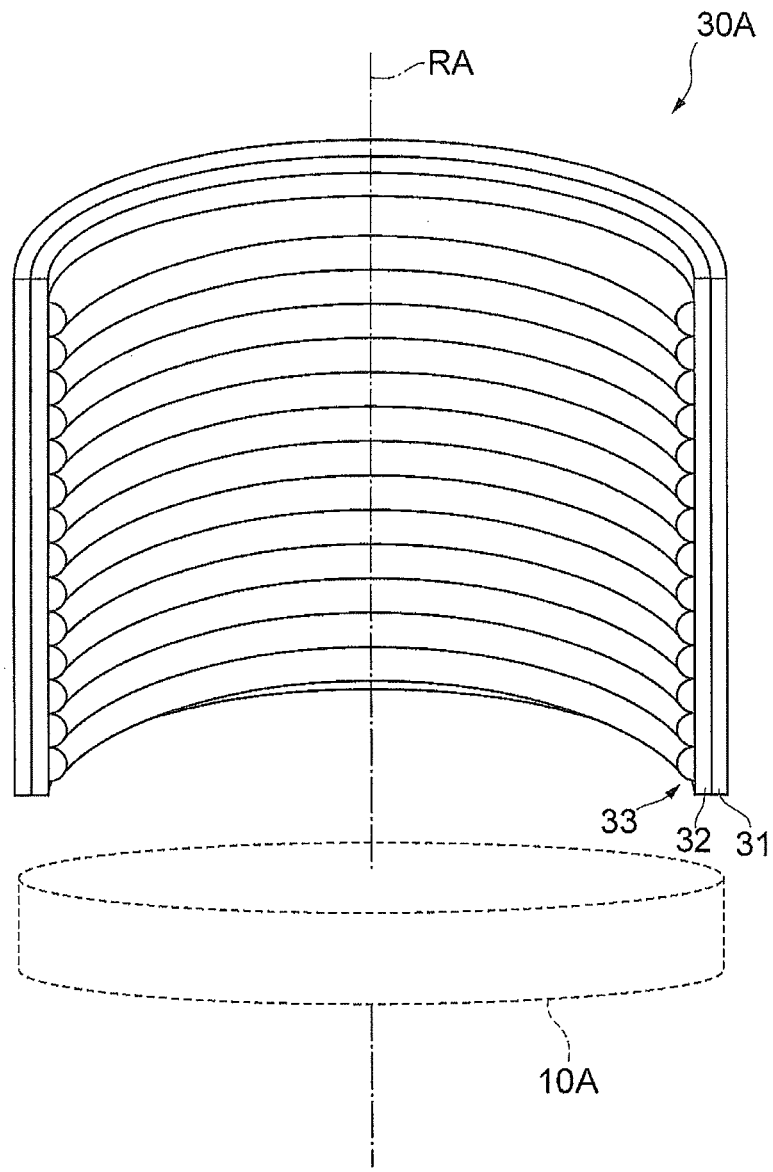
FIG. 3 is a diagram for explaining an image projection unit shown in FIG. 1.
Figure 4:
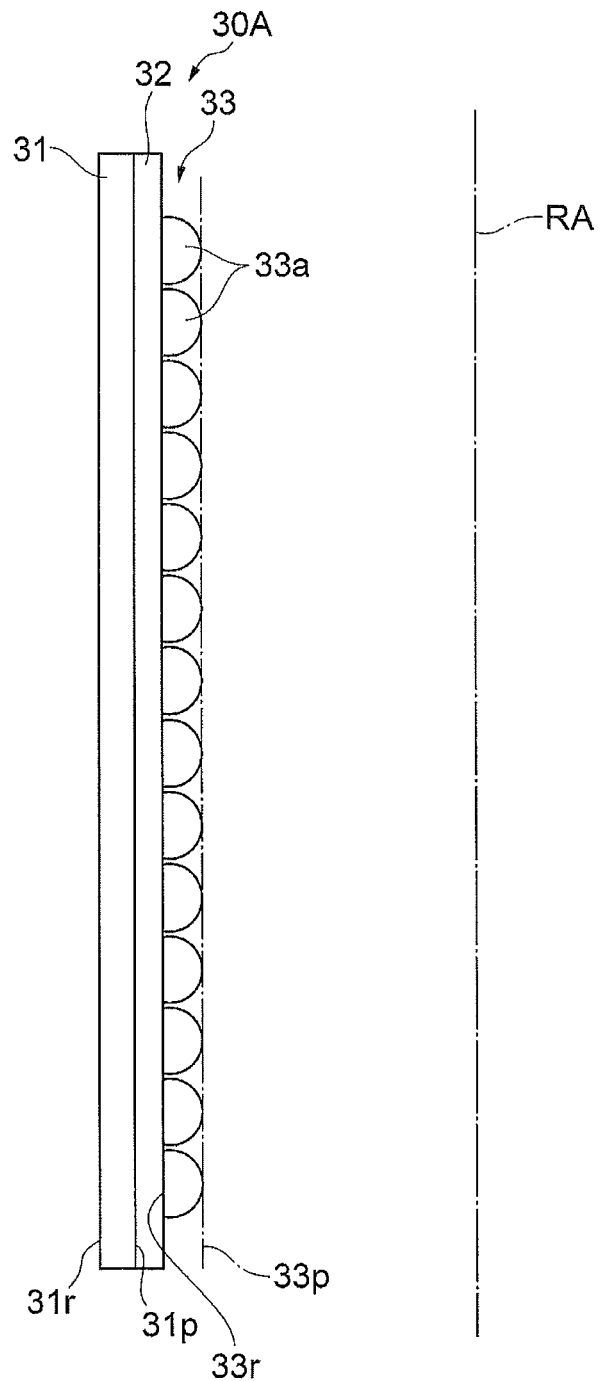
FIG. 4 is a diagram for explaining the image projection unit shown in FIG. 1.

FIGS. 3 and 4 are diagrams for explaining the configuration of the image projection unit 30A. The image projection unit 30A reflects the image light L in the predetermined direction, and diffuses the image light L in one direction (second direction). The one direction in the first embodiment is a direction along the rotation axis RA. The image projection unit 30A has a shape that is erected along the rotation axis RA including the center of rotation and is curved in a direction perpendicular to the rotation axis RA. The image projection unit 30A has a configuration in which a reflection plate 32 and a diffusion plate 33 are stacked on a base 31. Referring to FIG. 4, the reflection plate 32 is formed on the base 31, and the diffusion plate 33 is formed on the reflection plate 32.

The base 31 has a top surface 31p onto which the image light L is projected and a bottom surface 31r located on the opposite side of the top surface 31p. For the base 31, for example, PMMA (acrylic), PC (polycarbonate), or glass, which is an optically transparent member, can be used. When viewed from the direction of the rotation axis RA, the base 31 has a shape of a predetermined curve. The predetermined curve is, for example, a circle, an ellipse, a parabola, or a hyperbola that is a conic section. The shape of the base 31 in the first embodiment is a shape obtained by cutting a part of the cylinder with a diameter of 600 mm. The base 31 has a shape in which a predetermined curve extends in a direction of the rotation axis RA and is curved in a direction perpendicular to the rotation axis RA.

The reflection plate 32 reflects the image light L incident on the image projection unit 30A. As the reflection plate 32, for example, an acrylic mirror that is a reflective material of synthetic resin can be used.

The diffusion plate 33 diffuses the image light L in a direction (second direction) along the rotation axis RA of the rotary driving unit 20. The diffusion plate 33 is disposed on the reflection plate 32. The diffusion plate 33 is a lenticular lens including a plurality of cylindrical lenses 33a, for example. The lenticular lens has a lens surface 33p through which the curved surface of the cylindrical lens 33a is exposed and a non-lens surface 33r located on the opposite side of the lens surface 33p.

The extending direction of the cylindrical lens 33a crosses the direction of the rotation axis RA. In addition, for example, 160 cylindrical lenses 33a per inch are disposed in the lenticular lens (LPI=160). The lenticular lens is bonded onto the reflection plate 32 of the base 31 using a double-sided tape for optical bonding, for example. In the first embodiment, the non-lens surface 33r is bonded so as to face the reflection plate 32. For the bonding of the lenticular lens, for example, an optically transparent adhesive sheet LUCI-ACS (registered trademark) CS9621T or LUCIACS (registered trademark) CS9622T of Nitto Denko Corporation can be used as a double-sided tape.

Figure 5:
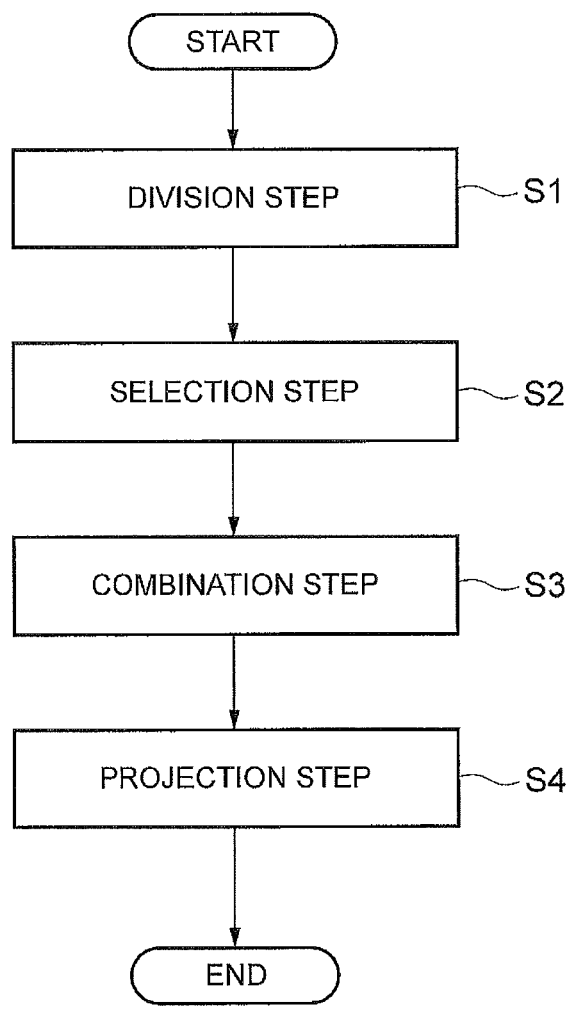
FIG. 5 is a flow diagram for explaining the main steps of a three-dimensional image projection method of the first embodiment.

Next, a three-dimensional image projection method will be described. FIG. 5 is a flow diagram showing the main steps of the three-dimensional image imaging method of the first embodiment. The three-dimensional image capturing method of the first embodiment includes a division step S1, a selection step S2, a combination step S3, and a projection step S4.

Figure 6:
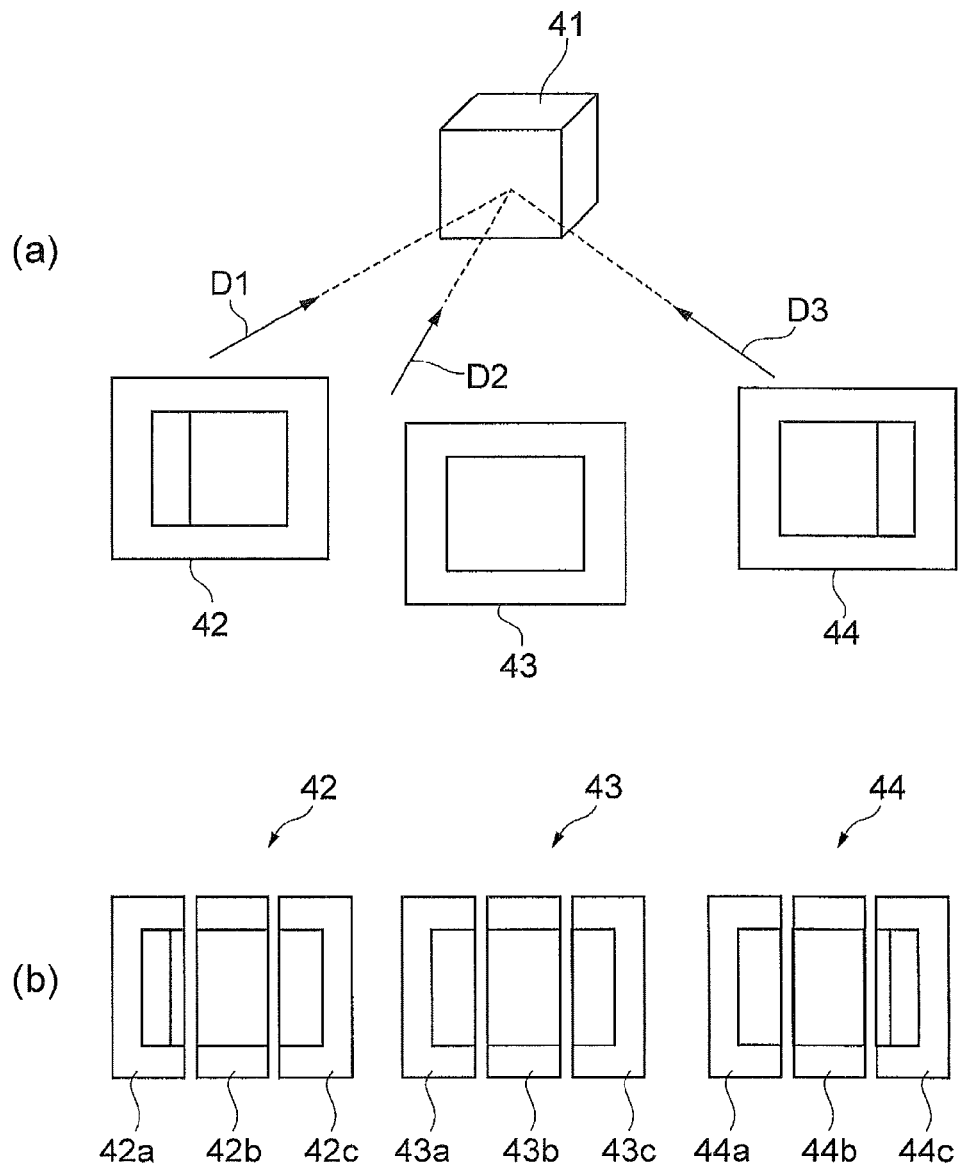
FIG. 6 is a diagram for explaining a step of the three-dimensional image projection method of the first embodiment.

First, an original image is prepared. FIG. 6(a) is a diagram for explaining a step of preparing original images. The original images are images obtained by changing the viewing point with respect to an object to different positions. In FIG. 6(a), as an example, an example is shown in which original images 42 to 44 are obtained by imaging the front view of an object 41 every 60° in a range of 60° in the right rotation direction and 60° in the left rotation direction. The captured original images 42 to 44 are input to the image generation unit 2. In addition, the original image may be an image obtained by setting the real object 41 as a projection target and imaging the object 41 with a digital camera or the like, for example. The original image may be an image in which a projection target is generated by computer graphics. An image captured by a video camera or the like may be input to the image generation unit 2 in real time.

Then, a step of dividing the original images 42 to 44 is performed (S1: division step). FIG. 6(b) is a diagram for explaining the step of dividing the original image. In this step S1, each of the original images 42 to 44 input to the image generation unit 2 is divided along one direction of the original images 42 to 44, thereby generating divided images. One direction of the present embodiment is a longitudinal direction of the original image. The number of divisions is set based on the shape or size of the image projection unit 30A, for example. Although each original image is divided into three images in FIG. 6(b), the actual number of divisions may be 3 or more. For example, the number of divisions may be 16 or more. There is no upper limit in particular in the number of divisions.

Then, a predetermined image is selected from the divided images (S3: selection step). The predetermined image is selected based on the rotation angle of the conversion optical system 10A and the position of the image light L projected to the image projection unit 30A.

The selection step S3 will be described in more detail. The image light L projected from the first optical member 11 to the image projection unit 30A is reflected by the reflection plate 32 of the image projection unit 30A. In this case, since the reflection plate 32 has a curved surface along the shape of the base 31, the image light L is reflected in different directions according to positions Pa to Pc projected to the image projection unit 30A. On the other hand, the position of the image light L is moved by the rotation of the conversion optical system 10A. Due to the movement, the incidence angle with respect to the reflection plate 32 changes at each of the positions Pa to Pc. Therefore, the image light L is reflected in a different direction at each rotation angle of the conversion optical system 10A. An image formed from the original image viewed from each direction is selected as an image that generates the image light L reflected in different directions.

Figure 7:
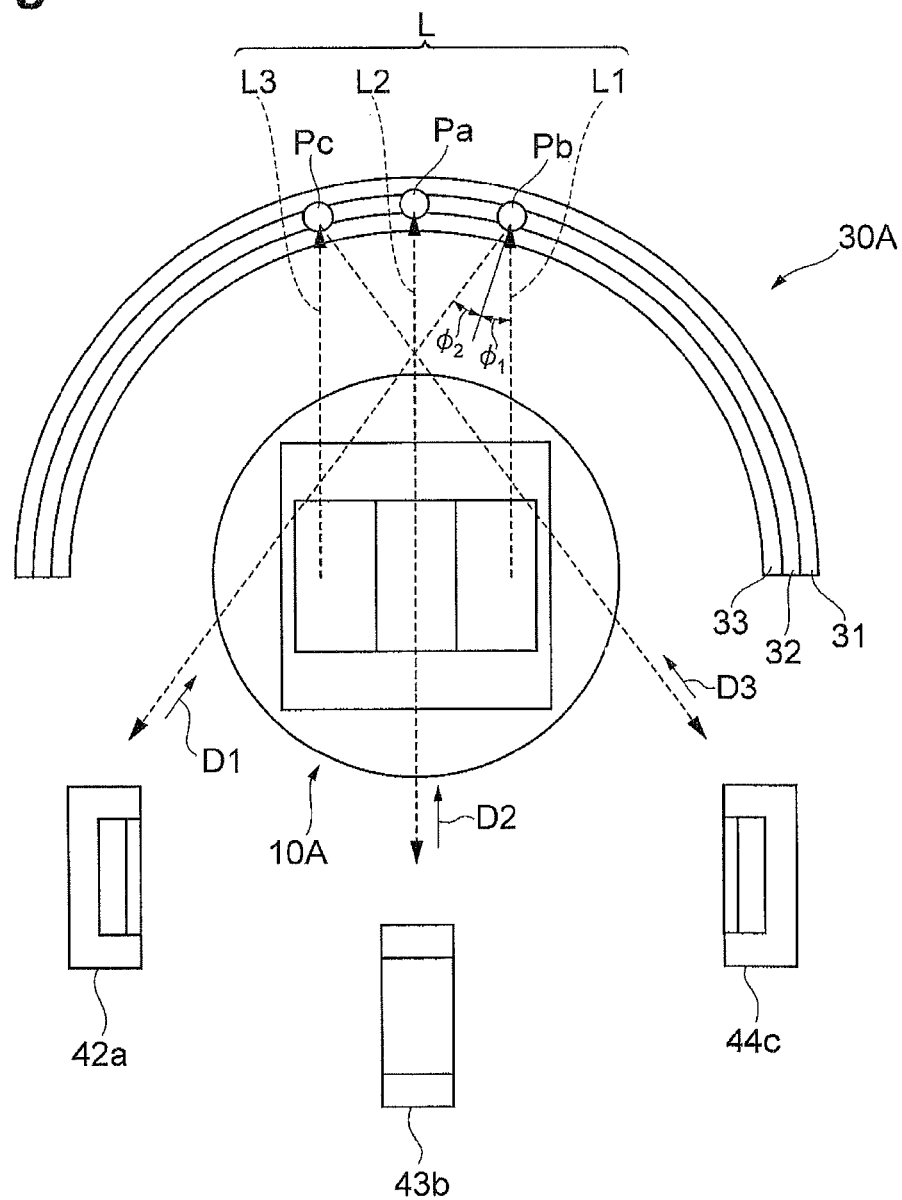
FIG. 7 is a diagram for explaining a step of the three-dimensional image projection method of the first embodiment.

For example, referring to FIG. 7, a part L1 of the image light L emitted from the conversion optical system 10A is reflected in a direction D1 at a reflection angle φ2 corresponding to an incidence angle φ1 with respect to the image projection unit 30A. For this reason, a projection image when the object 41 is viewed from the direction D1 must have the part L1 of the image light L projected thereon. Therefore, one of divided images 42a to 42c obtained by dividing the original image 42 is selected.

In addition, a part L2 of the image light L emitted from the conversion optical system 10A is reflected in a direction D2. For this reason, a projection image when the object 41 is viewed from the direction D2 must have the part L2 of the image light L projected thereon. Therefore, one of divided images 43a to 43c obtained by dividing the original image 43 is selected.

In addition, an other part L3 of the image light L emitted from the conversion optical system 10A is reflected in a direction D3. For this reason, a projection image when the object 41 is viewed from the direction D3 must have the part L3 of the image light L projected thereon. Therefore, one of divided images 44a to 44c obtained by dividing the original image 43 is selected.

Then, the selected divided images are combined (S5: combination step). In this step S5, the selected divided images are combined to form a composite projection image.

Then, the composite projection image is input to the image light emission unit 3, and the image light L projecting the composite projection image is projected to the image projection unit 30A (S7: projection step). In the projection step S4, the image light L is projected to the image projection unit 30A through the conversion optical system 10A. A three-dimensional image is projected through the above steps.

The process of generating a composite projection image projected to the image projection unit 30A through the division step S1, the selection step S2, and the combination step S3 has been described. In recent years, since the performance of the image processing apparatus (image processing board) is high, these steps S1, S2, and S3 may be set as an algorithm, and a composite projection image may be generated by automatic processing (algorithm) using software.

Figure 21:
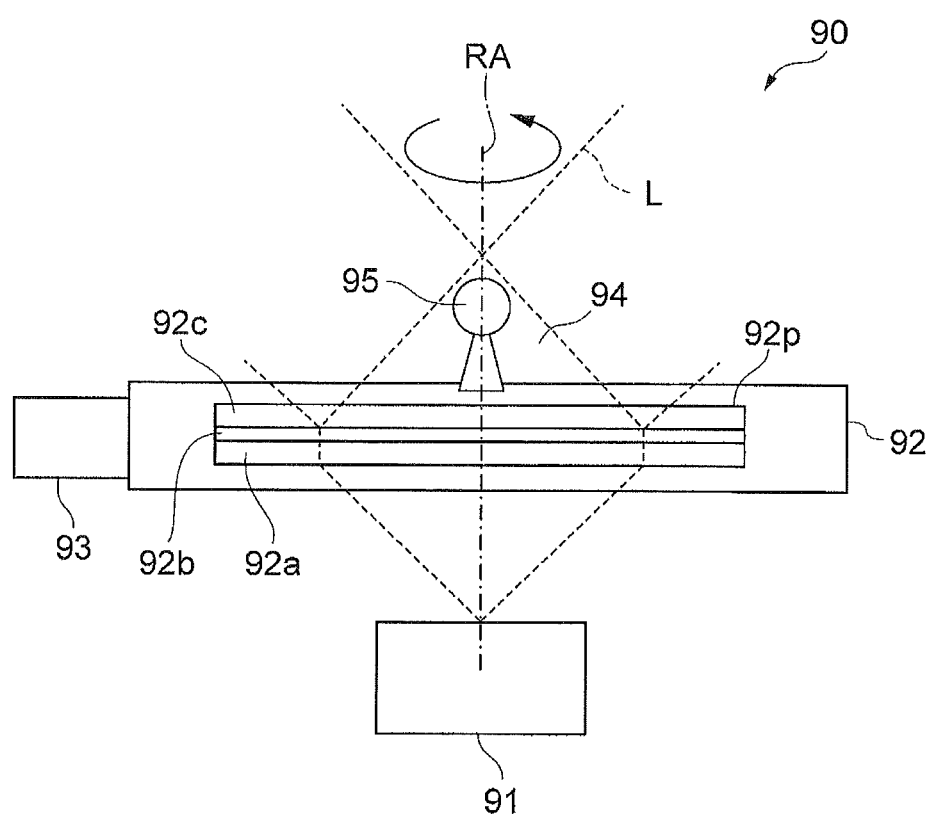
FIG. 21 is a diagram for explaining a three-dimensional image projector of a comparative example.

Problems of a three-dimensional image projector in a comparative example will be described. FIG. 21 is a diagram for explaining the effect of a three-dimensional image projector 90 in a comparative example. The three-dimensional image projector 90 includes an image light emission unit 91, a conversion optical system 92, and a rotary driving unit 93. The conversion optical system 92 includes a first optical unit 92a, a second optical unit 92b, and a diffusion plate 92c. The first optical unit 92a converts the image light L into parallel light. The second optical unit 92b converts the traveling direction of the image light L converted into parallel light. The diffusion plate 92c diffuses the image light L, of which the traveling direction has been converted, in a predetermined direction. That is, the three-dimensional image projector 90 is different from the three-dimensional image projector 1A of the first embodiment in that the image projection unit 30A is not provided and the conversion optical system 92 includes the diffusion plate 92c.

The three-dimensional image projector 90 projects the image light L, which is emitted from the image light emission unit 91, through the conversion optical system 92. Then, the traveling direction of the image light L is converted, and the conversion optical system 92 rotates in a state where the direction has been converted. Therefore, the three-dimensional image 95 is projected to the triangular pyramid-shaped spatial region 94. According to such a three-dimensional image projector 90, the region to which the three-dimensional image 95 is projected is limited to the spatial region 94. Since the spatial region 94 is formed near a top surface 92p of the diffusion plate 92c, it is difficult to realize a projection as if the three-dimensional image 95 was floating in the air.

On the other hand, according to the three-dimensional image projector 1A of the first embodiment, the conversion optical system 10A converts the traveling direction of the image light L into the predetermined direction. Therefore, according to the rotation of the conversion optical system 10A, the image light L is projected to the image projection unit 30A while scanning a region around the rotation axis RA. Since this image projection unit 30A has the reflection plate 32, the projected image light L is reflected at a reflection angle corresponding to the incidence angle. Since the conversion optical system 10A is driven to rotate by the rotary driving unit 20, the projected position of the image light L in the image projection unit 30A is moved in the rotation direction. Thus, the three-dimensional image 35 can be generated in a large region apart from the conversion optical system 10A by using the conversion optical system 10A and the image projection unit 30A.

Figure 8:
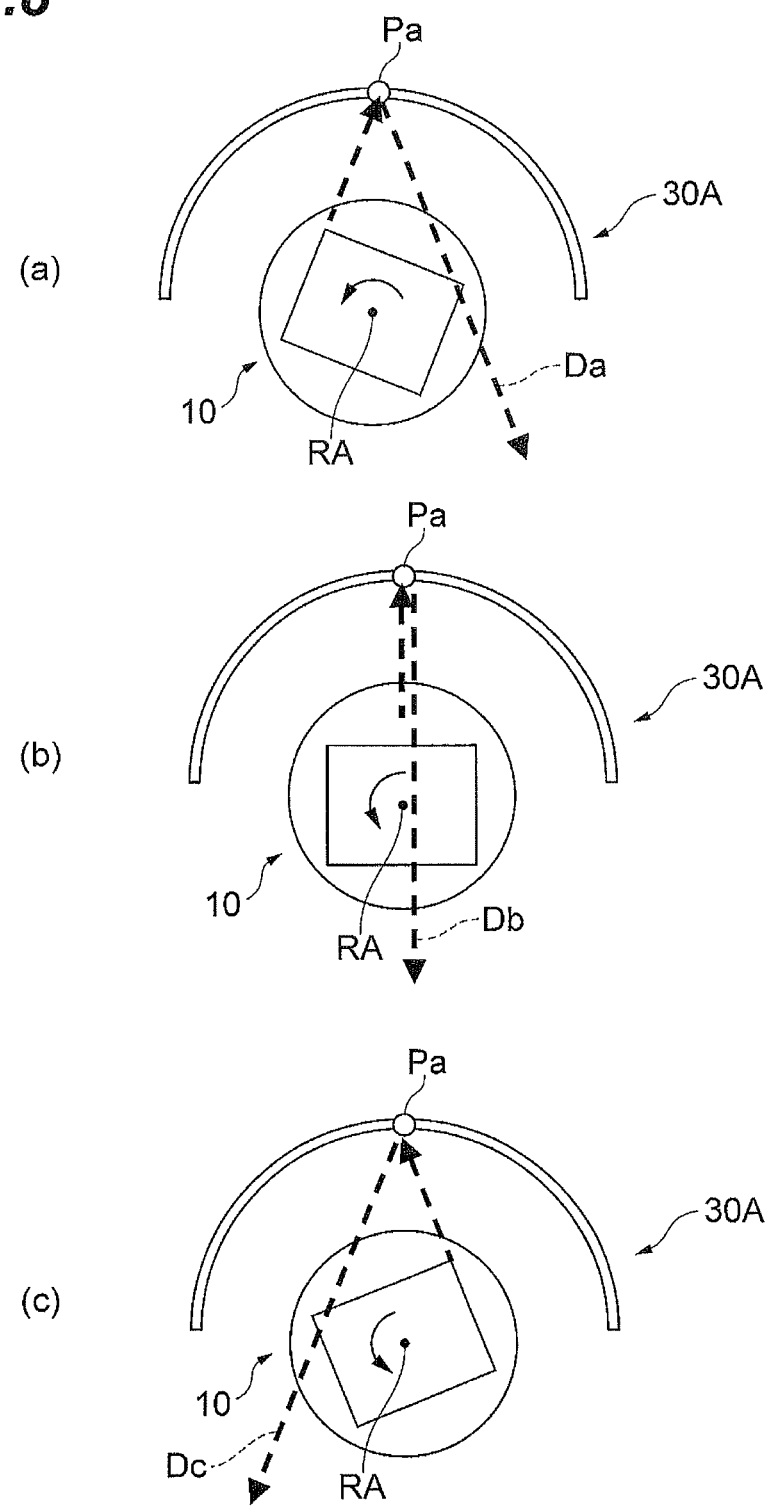
FIG. 8 is a diagram for explaining the effect of the three-dimensional image projector of the first embodiment.

Here, FIG. 8 is referred to. FIG. 8 is a diagram for explaining the effect of the three-dimensional image projector 1A. FIG. 8(a) shows a traveling direction of a part of the image light L at a predetermined rotation angle. The image light L is reflected at a reflection angle corresponding to the incidence angle at a predetermined point Pa of the image projection unit 30A, and travels in a direction of the arrow Da. Then, FIG. 8(b) shows a traveling direction of a part of the image light L when the conversion optical system 10A is rotated by a fixed angle from the state of FIG. 8(a). In this case, the image light L reflected at the point Pa is reflected at a reflection angle corresponding to the incidence angle, and travels in a direction of the arrow Db. FIG. 8(c) shows a traveling direction of a part of the image light L when the conversion optical system 10A is rotated by a fixed angle from the state of FIG. 8(b). In this case, the image light L reflected at the point Pa is reflected at a reflection angle corresponding to the incidence angle, and travels in a direction of the arrow Dc. Thus, when the projected position is moved, the image light L is reflected in different directions from the image projection unit 30A. Therefore, a three-dimensional image can be displayed.

Figure 9:
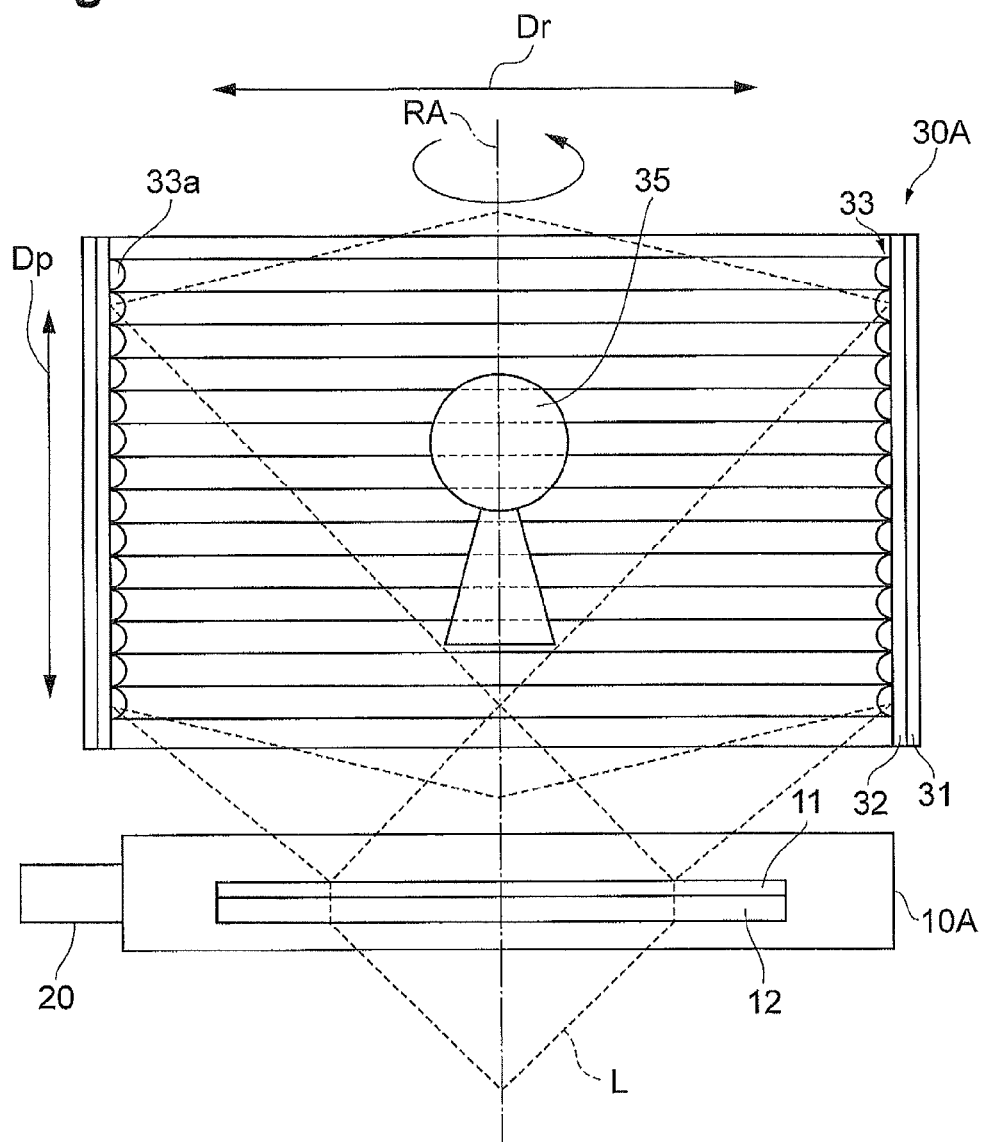
FIG. 9 is a diagram for explaining the effect of the three-dimensional image projector of the first embodiment.

FIG. 9 is a diagram for explaining the effect of the three-dimensional image projector 1A. In the three-dimensional image projector 1A, the diffusion plate 33 of the image projection unit 30A diffuses the projected image light L in one direction. The diffusion plate 33 of the first embodiment is disposed so that the extending direction Dr of the cylindrical lens 33a crosses the rotation axis RA. As a result, since the image light L reflected by the image projection unit 30A is diffused in a direction Dp along the rotation axis RA, a region in a vertical direction where the three-dimensional image 35 is viewed can be extended in a direction along the rotation axis RA.

Therefore, it is possible to easily extend a region in a vertical direction where the three-dimensional image 35 is viewed.

The region where the three-dimensional image 35 is displayed is formed in a region surrounded by the image projection unit 30A. Since the image projection unit 30A is disposed apart from the conversion optical system 10A by a predetermined distance, the three-dimensional image 35 can be displayed at a position apart from the conversion optical system 10A in a direction of the rotation axis RA. Therefore, it is possible to realize a projection as if the three-dimensional image 35 was floating.

Figure 10:
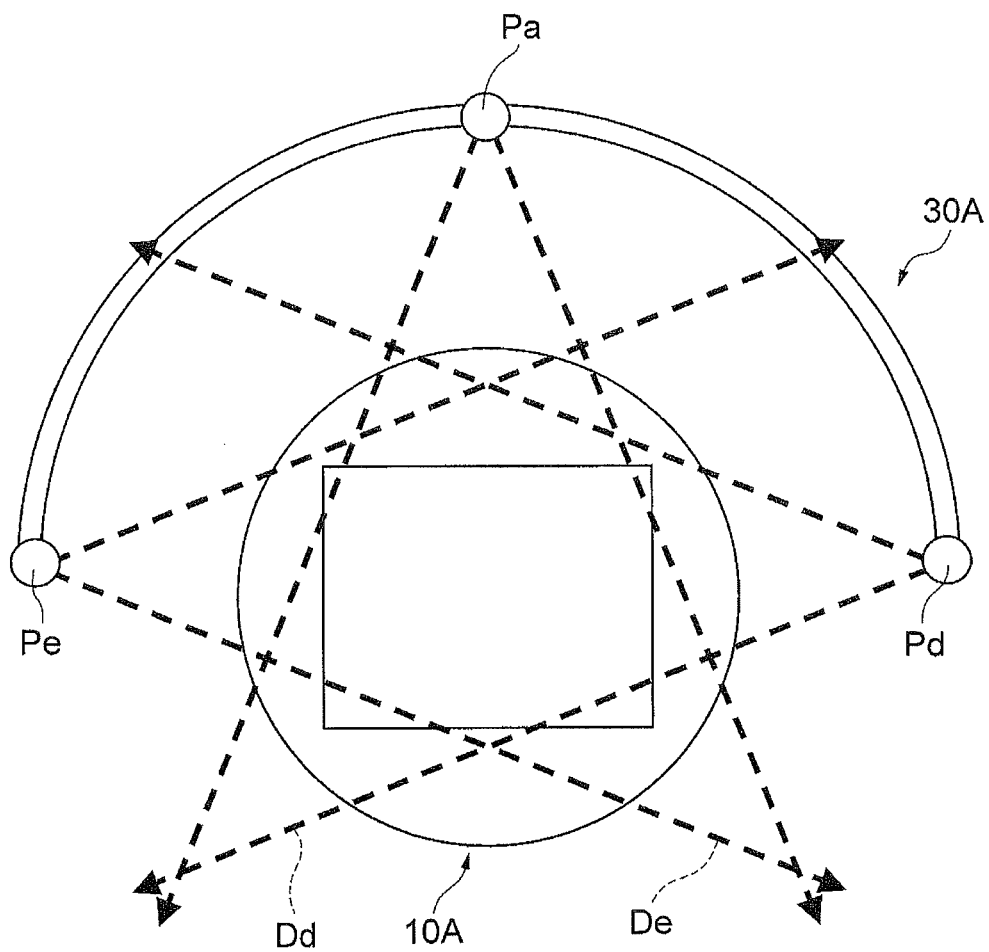
FIG. 10 is a diagram for explaining the effect of the three-dimensional image projector of the first embodiment.

FIG. 10 is a diagram for explaining the effect of the three-dimensional image projector 1A from another viewing point. The image projection unit 30A of the three-dimensional image projector 1A has a shape curved in a direction perpendicular to the rotation axis RA. For this reason, the image light L reflected from the image projection unit 30A is projected to a region surrounded by the image projection unit 30A. More specifically, the image light L reflected from the image projection unit 30A is projected to a region surrounded by the image projection unit 30A, a surface including a reflection direction Dd of the image light L from a point Pd, and a surface including a reflection direction De of the image light L from a point Pe. Therefore, it is possible to extend a region, in which a three-dimensional image is viewed, in a so-called depth direction. Therefore, it is possible to further extend a region where a three-dimensional image is viewed.

The point Pd is an end of the image projection unit 30A when the image projection unit 30A is viewed from the direction of the rotation axis RA. From the point Pd, the image light L is reflected in different directions. A direction having a directional component, which is apart from the image projection unit 30A, in the reflected image light L is the reflection direction Dd. The point Pe is the other end of the image projection unit 30A when the image projection unit 30A is viewed from the direction of the rotation axis RA. A direction having a directional component, which is apart from the image projection unit 30A, in the image light L reflected from the point Pe is the reflection direction De.

In addition, according to the three-dimensional image projection system 100A including the three-dimensional image projector 1A, the conversion optical system 10A converts the traveling direction of the image light L into the predetermined direction. Therefore, according to the rotation of the conversion optical system 10A, the image light L is projected to the image projection unit 30A while scanning the region around the rotation axis RA. Since this image projection unit 30A has the reflection plate 32, the projected image light L is reflected at a reflection angle corresponding to the incidence angle. Since the conversion optical system 10A is driven to rotate by the rotary driving unit 20, the projected position of the image light L in the image projection unit 30A is moved in the rotation direction. When the projected position is moved, the incidence angle of the image light L with respect to the image projection unit 30A is changed, and the reflection angle is also changed according to the change of in the incidence angle. The projected image light L projects a projection image including the selection image that is selected based on the rotation angle of the conversion optical system 10A and the position of the image light L, which is projected from the rotation angle to the image projection unit 30A, in the image projection unit 30A. Therefore, in different directions, the image light L corresponding to the directions are projected. As a result, even if the position of the viewer is changed, it is possible to display a three-dimensional image with high reproducibility. Thus, the three-dimensional image 35 can be generated in a large region apart from the conversion optical system 10A by using the conversion optical system 10A and the image projection unit 30A. The diffusion plate 33 of the image projection unit 30A diffuses the projected image light L in one direction. As a result, since the image light L reflected by the image projection unit 30A is diffused in one direction, a region where the three-dimensional image 35 is displayed can be extended in one direction. Therefore, it is possible to easily extend the region where the three-dimensional image 35 is displayed.

Second Embodiment

Figure 11:
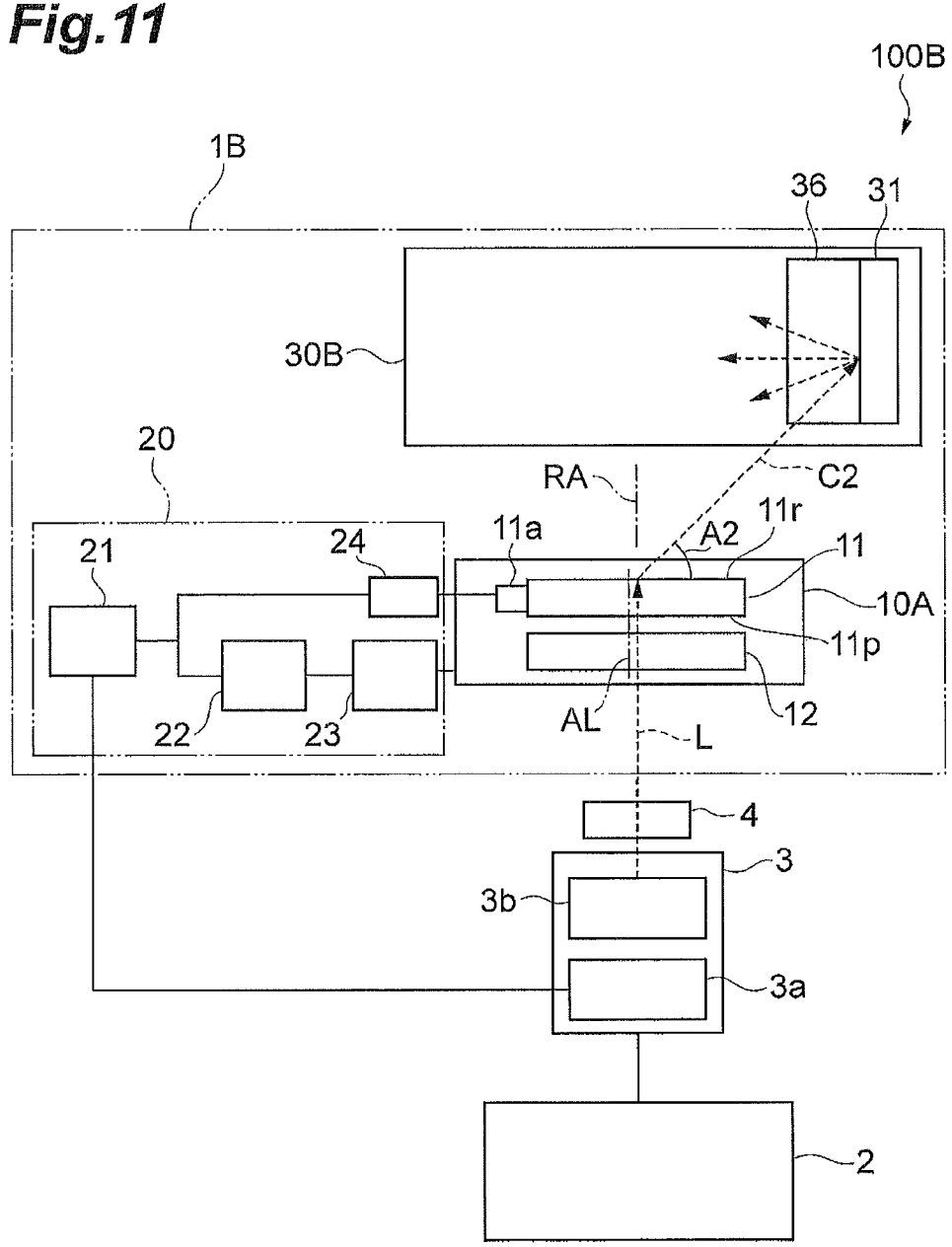
FIG. 11 is a block diagram for explaining the configuration of a three-dimensional image projection system including a three-dimensional image projector of a second embodiment.

Next, a three-dimensional image projection system 100B including a three-dimensional image projector 1B of a second embodiment will be described. As shown in FIG. 11, the three-dimensional image projector 1B of the second embodiment is different from the three-dimensional image projector 1A of the first embodiment in that an image projection unit 30B includes an optical sheet 36, in which a diffraction grating is formed, instead of the reflection plate 32 and the diffusion plate 33. Other configurations of the three-dimensional image projector 1B of the second embodiment are the same as those of the three-dimensional image projector 1A of the first embodiment. Hereafter, the image projection unit 30B will be described in detail.

Figure 12:
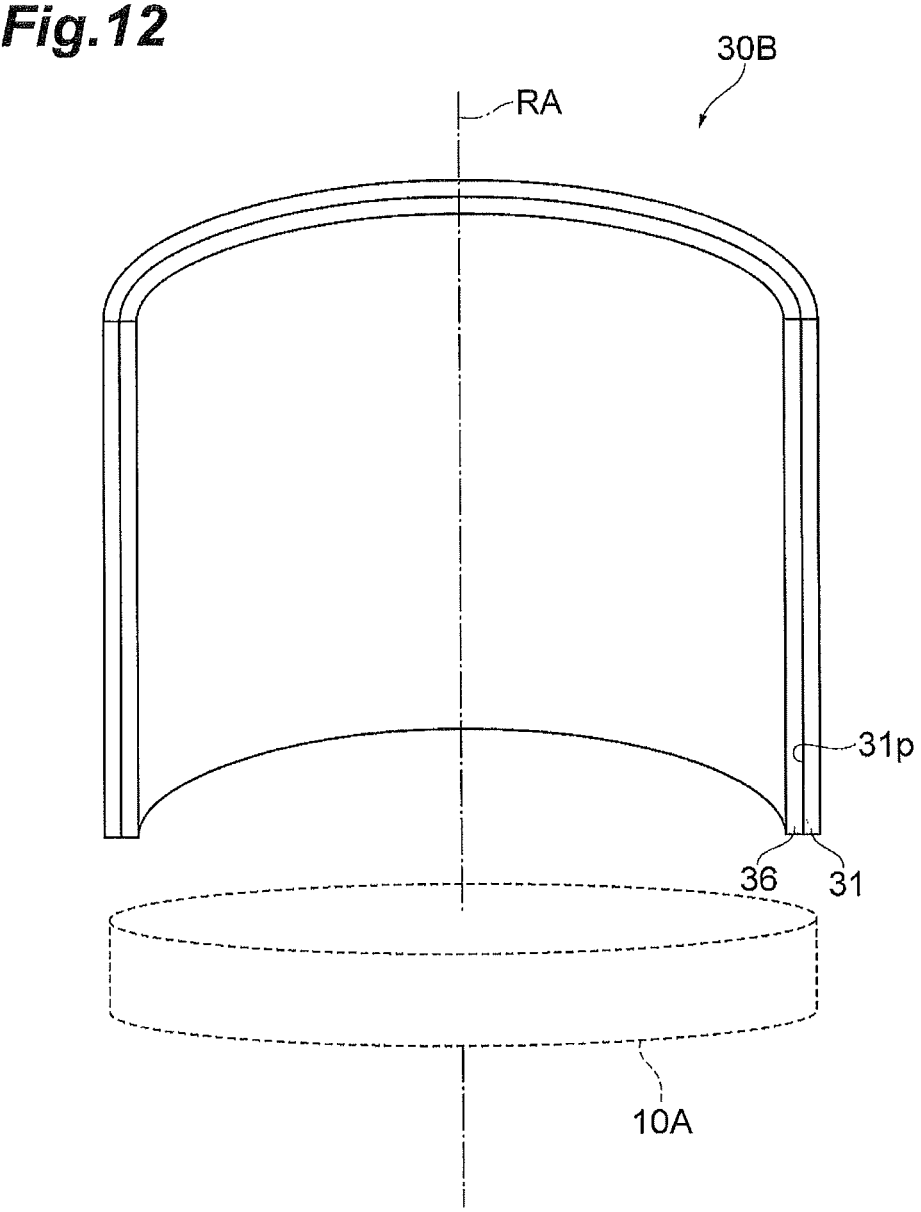
FIG. 12 is a diagram for explaining an image projection unit shown in FIG. 11.

As shown in FIG. 12, the image projection unit 30B has the base 31 and the optical sheet 36. The optical sheet 36 in which the diffraction grating is formed is bonded to the top surface 31p of the base 31. As the optical sheet 36, for example, a hologram can be used. The hologram is a medium on which the information of light is recorded using holographic techniques. When light is irradiated to this hologram, diffraction of light occurs due to the diffraction grating that forms a hologram, and light in which the light intensity and the phase, which are the information of light recorded on the hologram, are reproduced is generated.

Figure 13:
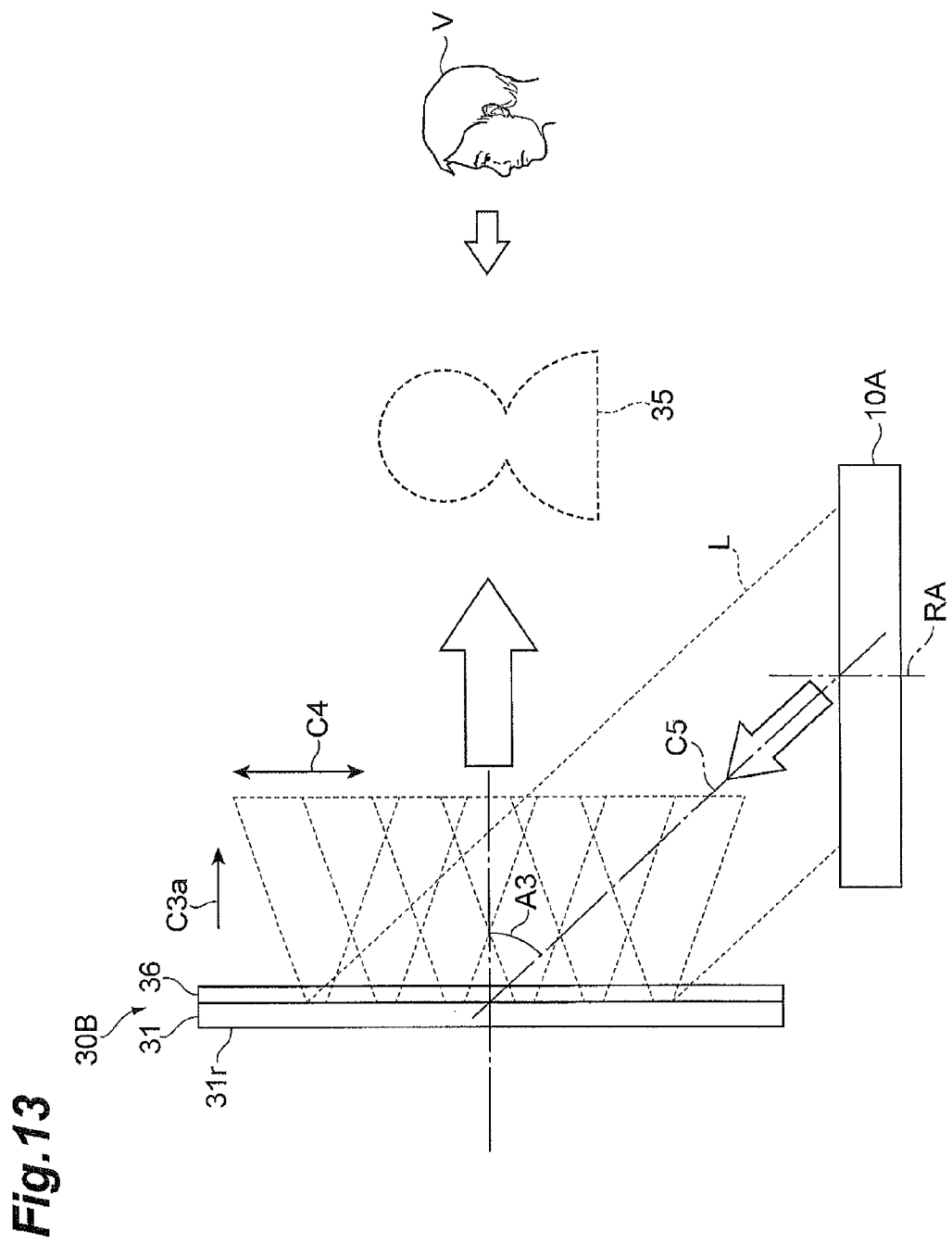
FIG. 13 is a diagram for explaining the operation of the three-dimensional image projector shown in FIG. 11.

As shown in FIG. 13, a reflection type hologram (Lippmann hologram) can be used as the optical sheet 36. On the optical sheet 36, the information of object light OL is recorded with light, which travels in the same direction as the image light L emitted from the conversion optical system 10A, as reference light RL. The object light OL recorded on the optical sheet 36 is light incident from the bottom surface 31r of the image projection unit 30B. That is, as the object light OL, light that travels in a first direction C3a along the surface perpendicular to the rotation axis RA and is diffused in a direction C4 (second direction) along the rotation axis RA is recorded. Therefore, when light is incident on the optical sheet 36 from the same direction as the reference light RL, light having the same information as the object light OL is reproduced. That is, when light is incident on the optical sheet 36 from the same direction as the reference light RL, light that travels in a first direction C3 along the surface perpendicular to the rotation axis RA and is diffused in the direction C4 along the rotation axis RA is reproduced. In this case, an angle A3 between an emission direction C5 of the image light L emitted from the conversion optical system 10A and the traveling direction C3a of the image light L after the direction is converted by the image projection unit 30B is set to 90° or less.

Figure 14:
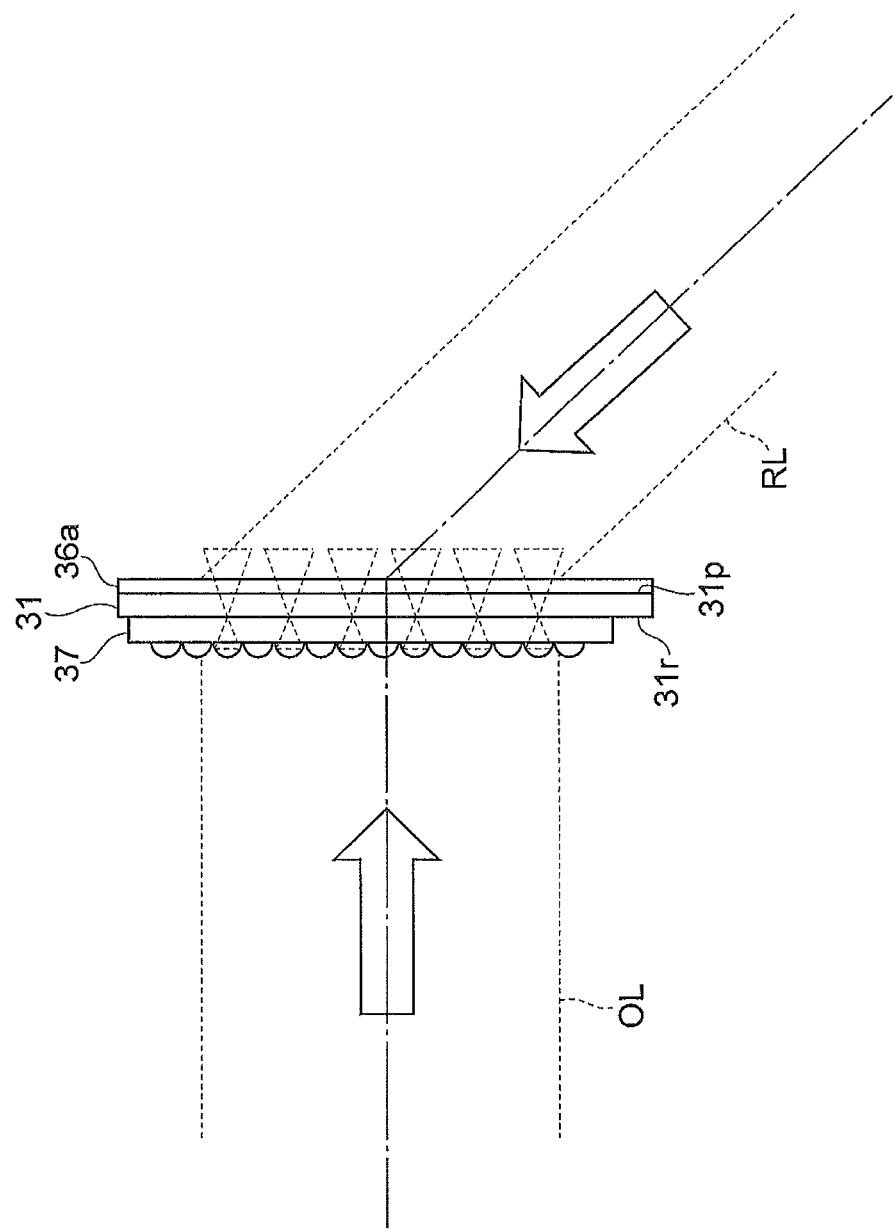
FIG. 14 is a diagram for explaining a method of manufacturing the image projection unit shown in FIG. 12.

Next, a method of manufacturing the optical sheet 36 that is a reflection type hologram will be described. As shown in FIG. 14, a photosensitive sheet 36a on which a hologram is recorded is prepared, and is bonded to the top surface 31p of the base 31. Then, a lens sheet 37 having a lenticular lens is disposed on the bottom surface 31r of the base 31. Then, the object light OL is irradiated from the bottom surface 31r side of the base 31, and the reference light RL is irradiated from the top surface 31p side of the base 31. The object light OL is parallel light incident perpendicular to the bottom surface 31r of the base 31. The reference light RL is parallel light incident at a predetermined angle with respect to the top surface 31p of the base 31. In addition, the predetermined angle is, for example, 22° from the surface of 31p. When the object light OL and the reference light RL are incident on the photosensitive sheet 36a, a diffraction grating corresponding to the interference fringes by the object light OL and the reference light RL is recorded on the photosensitive sheet 36a. By the above procedure, the optical sheet 36 that is a reflection type hologram is manufactured. In addition, when displaying a color three-dimensional image in the three-dimensional image projector 1B, the optical sheet 36 is manufactured by performing multiple exposure of the reference light RL and the object light OL with laser light of red, green, and blue.

In addition, the method of manufacturing the optical sheet 36 is not limited to the method described above. For example, the optical sheet 36 may be manufactured using a hologram forming apparatus (Japanese Unexamined Patent Application Publication No. 11-249536) invented by the present inventor. In addition, the optical sheet 36 may be bonded to the base 31 after being manufactured by exposure.

Next, a three-dimensional image projection method using the three-dimensional image projector 1B of the second embodiment will be described. The image projector 1B is different from the image projector 1A only in that the image projection unit 30B includes the optical sheet 36 that is a reflection type hologram. Therefore, as a three-dimensional image projection method using the three-dimensional image projector 1B, it is possible to use the three-dimensional image projection method described in detail in the first embodiment.

According to the three-dimensional image projector 1B of the second embodiment, the conversion optical system 10A converts the traveling direction of the image light L into a predetermined direction. Therefore, according to the rotation of the conversion optical system 10A, the image light L is projected to the image projection unit 30B while scanning the region around the rotation axis RA. The image projection unit 30B has the optical sheet 36 that is a reflection type hologram. Therefore, the projected image light L is converted in the same direction C3a as the traveling direction of the object light OL recorded on the optical sheet 36, and is diffused in the direction C4 along the rotation axis RA. Since the conversion optical system 10A is driven to rotate by the rotary driving unit 20, the projected position of the image light L in the image projection unit 30B is moved in the rotation direction. The first direction C3a corresponds to a position on the image projection unit 30B and the incidence angle of the image light L to the position. For this reason, when the image light L is projected while scanning the image projection unit 30B, the image light L is projected in different directions corresponding to the position on the image projection unit 30B and the incidence angle to the position. Therefore, since it is possible to project an image according to the viewing point of a viewer V, the three-dimensional image 35 can be displayed. In addition, the three-dimensional image 35 can be generated in a large region apart from the conversion optical system 10A by using the conversion optical system 10A and the image projection unit 30B.

According to the three-dimensional image projector 1B of the second embodiment, the image projection unit 30B has the optical sheet 36 that is a reflection type hologram. According to this optical sheet 36, when light is incident from the same direction as the reference light RL, light having the same information as the object light OL is reproduced. That is, corresponding only to the image light L emitted from the conversion optical system 10A, the image light L is converted into light that travels in the first direction C3a and is diffused in the direction C4 along the rotation axis RA. For this reason, even if light is incident on the image projection unit 30B from a direction other than the incidence direction of the image light L, the light is not converted into light that travels in the first direction C3a and is diffused in the direction C4. Therefore, it is possible to suppress a reduction in the visibility of the three-dimensional image 35 caused by the incidence of ambient light onto the image projection unit 30B.

In addition, if a black member is selected as the base 31 or if the bottom surface 31r or the top surface 31p is made black, the contrast of the background is improved. Accordingly, it is possible to further improve the visibility of the three-dimensional image 35.

According to the three-dimensional image projector 1B of the second embodiment, the image projection unit 30B does not include the diffusion plate 33. Therefore, since it is possible to suppress the occurrence of color dispersion caused by the diffraction of the diffusion plate 33, it is possible to suppress the occurrence of color unevenness of the three-dimensional image 35.

In addition, according to the three-dimensional image projector 1B of the second embodiment, the image projection unit 30B does not include the diffusion plate 33, and only light from the incidence direction of the image light L is converted into light diffused in the direction C4. Accordingly, it is possible to manufacture the image projection unit 30B that is transparent. Thus, the viewer V can view a three-dimensional image displayed in the space on the front or back side of the image projection unit 30B, and can also view an object or scene on the opposite side of the image projection unit 30B that is transmitted.

Third Embodiment

Next, a three-dimensional image projector of a third embodiment will be described. The three-dimensional image projector of the third embodiment is different from the three-dimensional image projector 1A of the first embodiment in that an image projection unit 30C includes an optical sheet 38, in which a diffraction grating is formed, instead of the reflection plate 32 and the diffusion plate 33. In addition, the three-dimensional image projector of the third embodiment is different from the three-dimensional image projector 1B of the second embodiment in that the optical sheet 38, which is a transmission type hologram, is provided instead of the optical sheet 36 that is a reflection type hologram. Other configurations of the three-dimensional image projector of the third embodiment are the same as those of the three-dimensional image projectors 1A and 1B of the first and second embodiments. Hereinafter, the image projection unit 30C including the optical sheet 38 will be described in detail.

Figure 15:
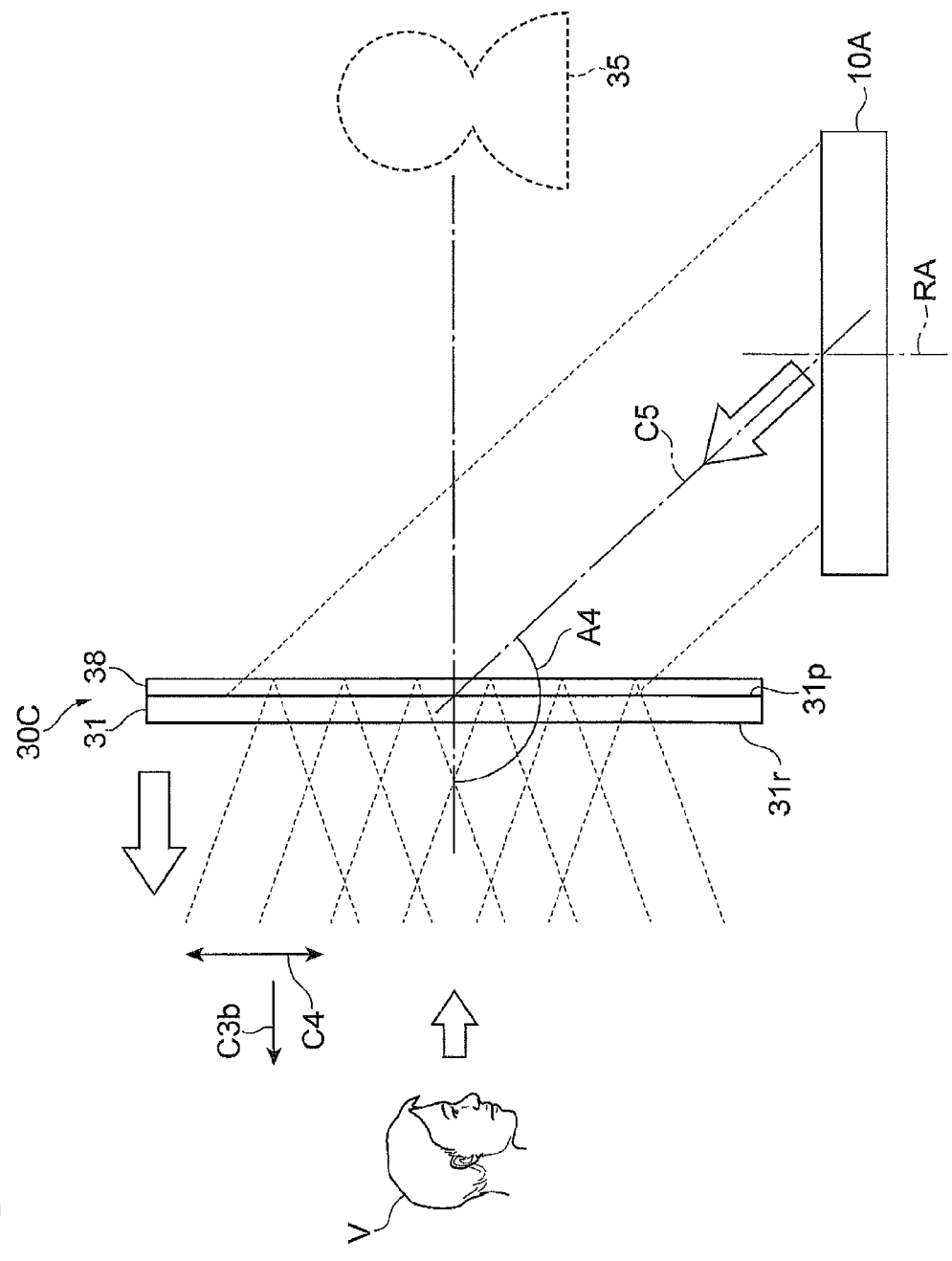
FIG. 15 is a diagram for explaining the operation of a three-dimensional image projector of a third embodiment.

As shown in FIG. 15, the image projection unit 30C has a base 31 and the optical sheet 38. For the base 31, PMMA, PC, or glass, which is an optically transparent member, can be used. The optical sheet 38 in which the diffraction grating is formed is bonded to the top surface 31p of the base 31. Here, a transmission type hologram is used as the optical sheet 38. On the optical sheet 38, the information of object light OL is recorded with light, which travels in the same direction as the image light L emitted from the conversion optical system 10A, as reference light RL. The object light OL recorded on the optical sheet 38 is light incident from the top surface 31p side of the base 31, and light that travels in a first direction C3b along the surface perpendicular to the rotation axis RA and is diffused in a direction C4 along the rotation axis RA is recorded (refer to FIG. 16). Therefore, when light is incident on the optical sheet 38 from the same direction as the reference light RL, light having the same information as the object light OL is reproduced. That is, when the image light L is incident on the optical sheet 38 from the same direction as the reference light RL, the image light L that travels in the first direction C3b and is diffused in the direction C4 is reproduced. In this case, an angle A4 between an emission direction C5 of the image light L emitted from the conversion optical system 10A and the traveling direction C3b of the image light L after the direction is converted by the image projection unit 30C is set to 90° or more.

Figure 16:
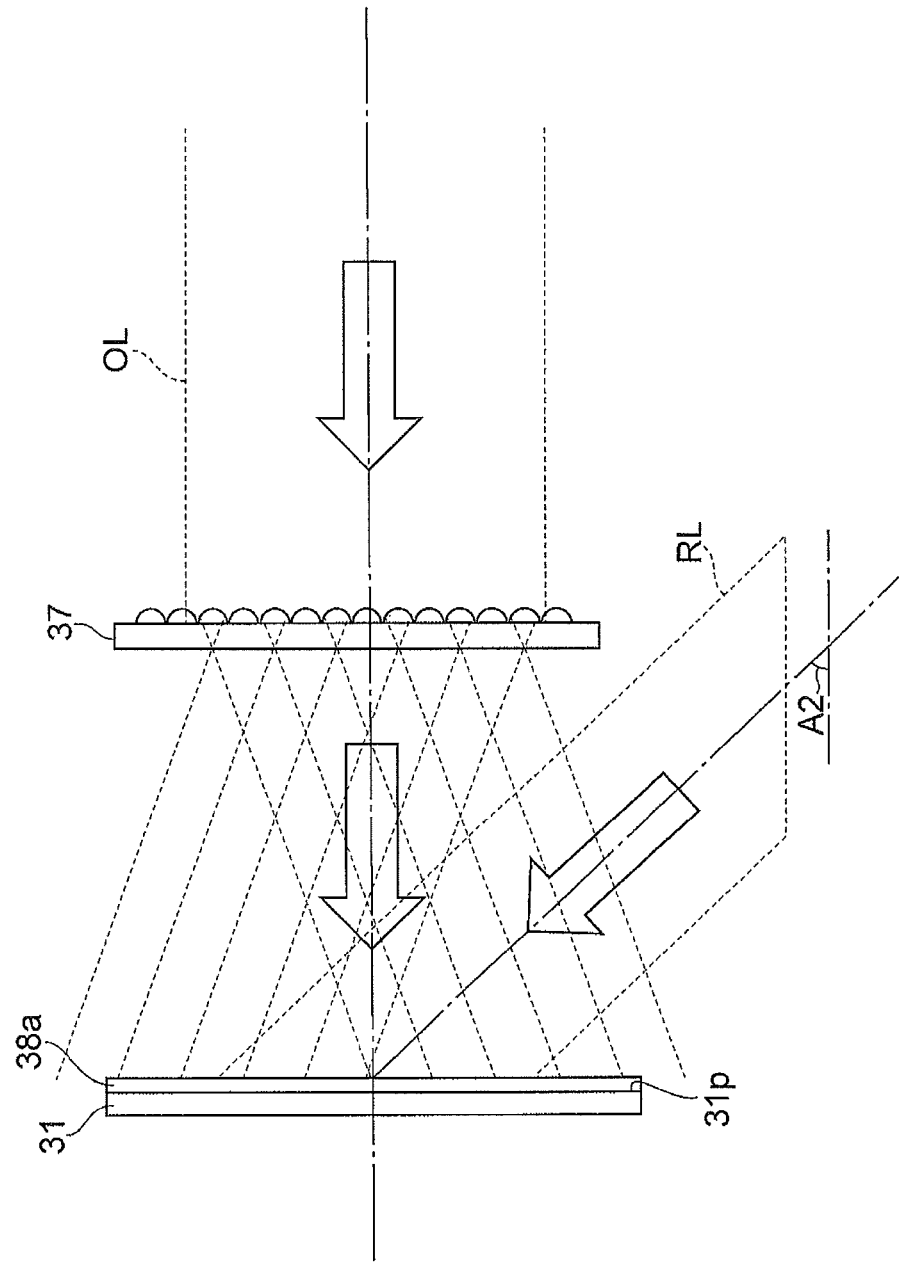
FIG. 16 is a diagram for explaining a method of manufacturing an image projection unit of the third embodiment.

Next, a method of manufacturing the optical sheet 38 that is a transmission type hologram will be described. As shown in FIG. 16, a photosensitive sheet 38a on which a transmission type hologram is recorded is prepared, and is bonded to the top surface 31p of the base 31. Then, a lens sheet 37 having a lenticular lens is disposed on the top surface 31p side of the base 31 so as to be spaced apart from the photosensitive sheet 38a. Then, the object light OL is irradiated from the top surface 31p side of the base 31, and the reference light RL is irradiated from the top surface 31p side of the base 31. The object light OL incident on the photosensitive sheet 38a is light irradiated from the lens sheet 37, and is light that is perpendicular to the base 31 and is diffused in one direction. The reference light RL is parallel light incident on the top surface 31p of the base 31 at a predetermined angle A2. The predetermined angle A2 is 68°, for example. By the above procedure, the optical sheet 38 that is a transmission type hologram is manufactured. In addition, when displaying a color three-dimensional image in this three-dimensional image projector, the optical sheet 38 is manufactured by performing multiple exposure of the reference light RL and the object light OL with laser light of red, green, and blue. Alternatively, the optical sheet 38 may be manufactured by multiple exposure in which the angle of each of the reference light RL and the object light OL is adjusted so as to correct the Bragg matching angle of each of red, green, and blue using only a monochrome laser. In addition, the optical sheet 38 may be bonded to the base 31 after being manufactured by exposure.

Next, a three-dimensional image projection method using the three-dimensional image projector 1C of the third embodiment will be described. The three-dimensional image projector 1C is different from the image projector 1A only in that the three-dimensional image projection unit 30C includes the optical sheet 38 that is a transmission type hologram. Therefore, as a three-dimensional image projection method using the three-dimensional image projector of the third embodiment, it is possible to use the three-dimensional image projection method described in detail in the first embodiment. More specifically, in the selection step S3 (refer to FIGS. 5 and 7), when generating the image light L transmitted through the image projection unit 30C, an image corresponding to the eye direction of the viewer V who views the three-dimensional image 35 from the bottom surface 31r of the base 31 is selected.

According to the three-dimensional image projector of the third embodiment, the three-dimensional image 35 can be generated in a large region apart from the conversion optical system 10A as in the three-dimensional image projector 1A of the first embodiment.

In addition, according to the three-dimensional image projector of the third embodiment, the optical sheet 38 that is a transmission type hologram is provided. Therefore, the three-dimensional image projector of the third embodiment can suppress a reduction in the visibility of the three-dimensional image 35 caused by the reflection of ambient light. In addition, the three-dimensional image projector of the third embodiment can suppress the occurrence of color unevenness of the three-dimensional image 35.

In addition, according to the three-dimensional image projector of the third embodiment, an object that is actually present and the three-dimensional image 35 that is reproduced can be displayed so as to overlap each other.

Fourth Embodiment

Next, a three-dimensional image projection system 100C including a three-dimensional image projector 1C of a fourth embodiment will be described. The three-dimensional image projector 1C of the fourth embodiment is different from the three-dimensional image projector 1A of the first embodiment in that a conversion optical system 10B further includes a third optical member 13. Other configurations of the three-dimensional image projector 1C of the fourth embodiment are the same as those of the three-dimensional image projector 1A of the first embodiment. Hereinafter, the conversion optical system 10B including the third optical member 13 will be described in detail.

Figure 17:
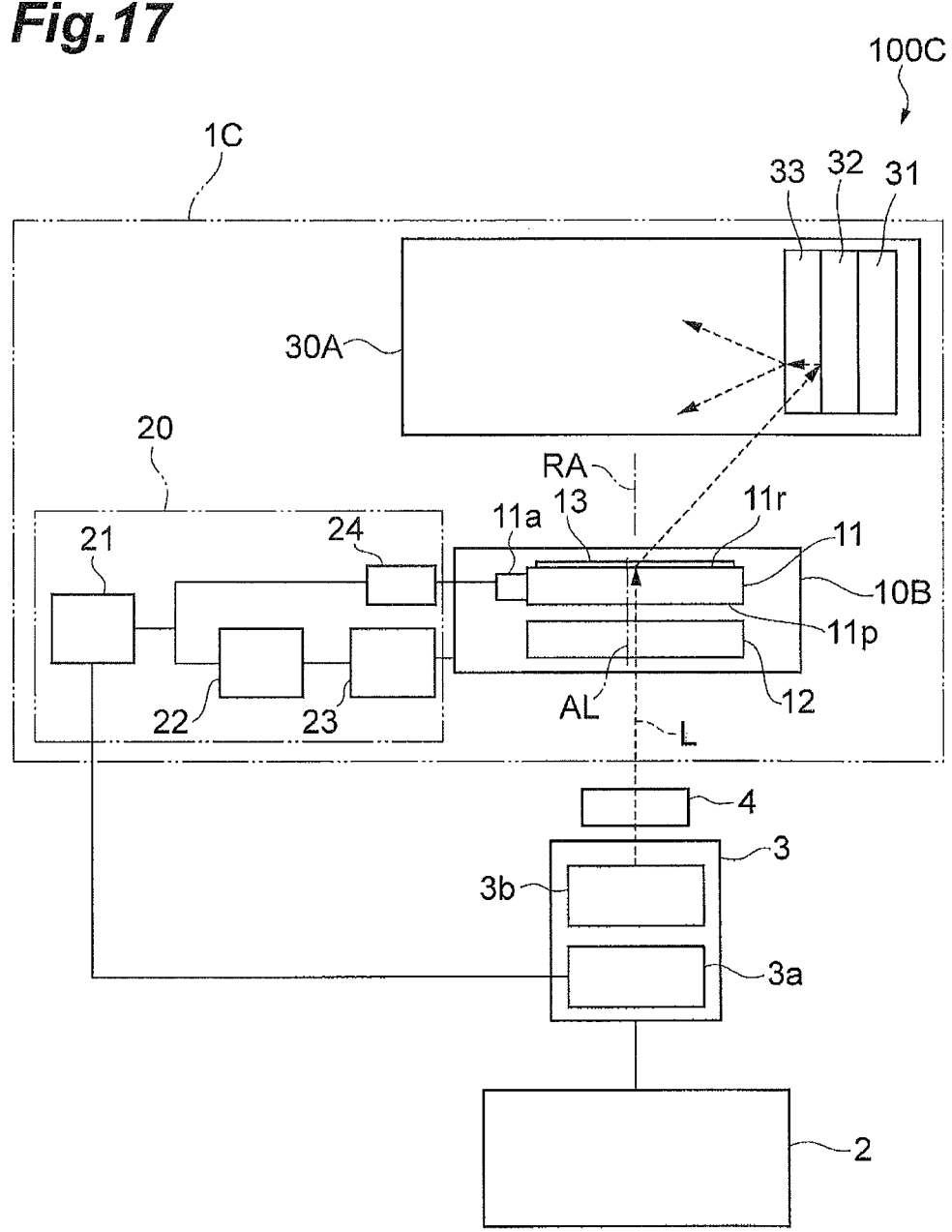
FIG. 17 is a block diagram for explaining the configuration of a three-dimensional image projection system including a three-dimensional image projector of a fourth embodiment.

As shown in FIG. 17, the conversion optical system 10B further includes the third optical member 13 in addition to the first and second optical members 11 and 12. In the conversion optical system 10B, the second optical member 12, the first optical member 11, and the third optical member 13 are disposed in order from the image light emission unit 3 side. The third optical member 13 is fixed to the emission surface 11r of the first optical member 11. Accordingly, the third optical member 13 rotates around the rotation axis RA in synchronization with the rotation of the first optical member 11.

Figure 18:
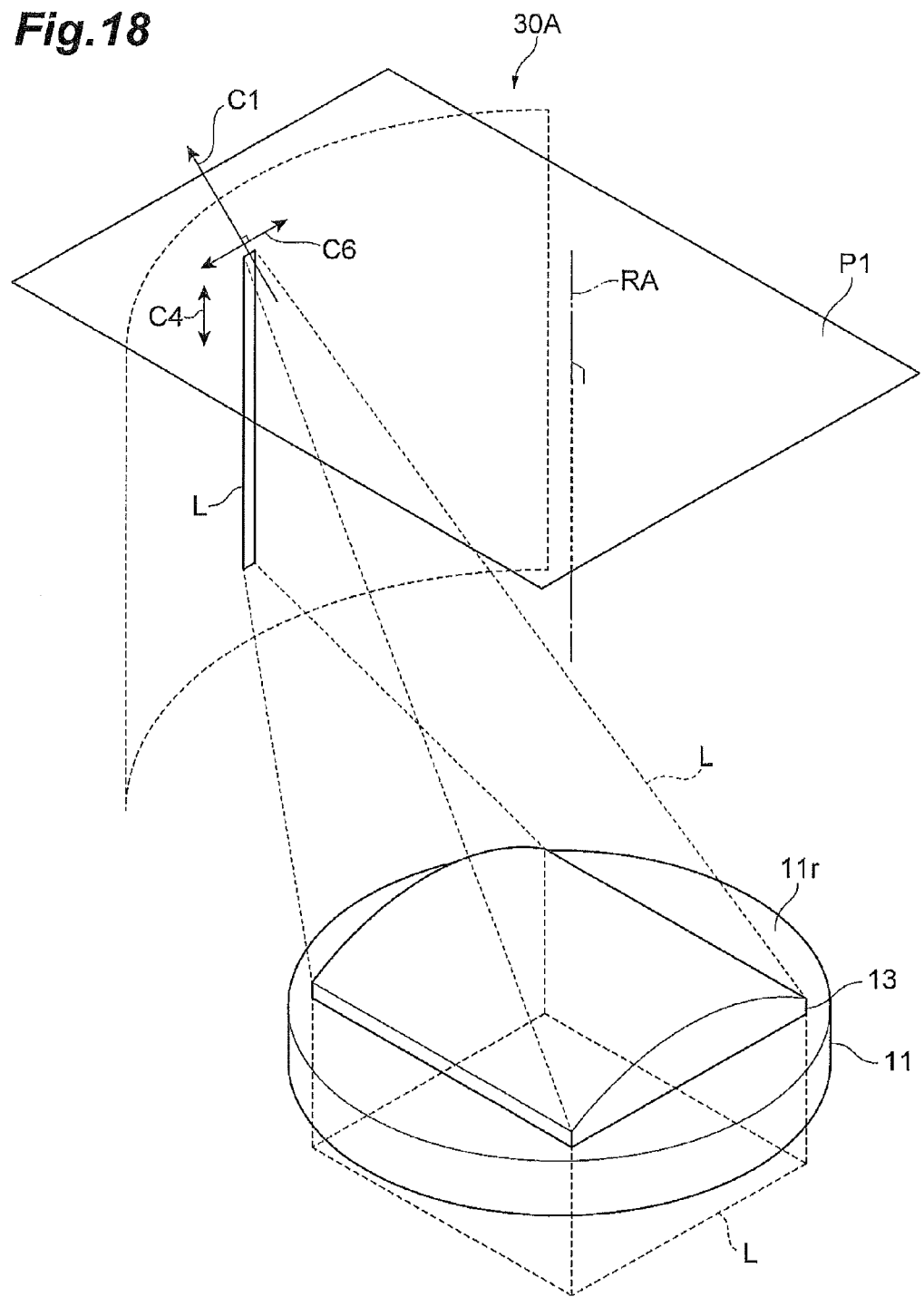
FIG. 18 is a diagram for explaining the operation of the three-dimensional image projector shown in FIG. 17.

As shown in FIG. 18, the third optical member 13 is a cylindrical lens for making the image light L, which is parallel light, converge in only one direction. The third optical member 13 makes the image light L converge in a third direction C6. Here, the third direction C6 is a direction included in a virtual surface P1 perpendicular to the rotation axis RA, and is a direction perpendicular to the emission direction C1 on the emission surface 11r of the first optical member 11. The image light L, which is emitted from the third optical member 13 and reaches the image projection unit 30A, converge in only the third direction C6 on the image projection unit 30A. For this reason, the image light L that reaches the image projection unit 30A does not converge in a direction C4 along the rotation axis RA on the image projection unit 30A.

In addition, as a cylindrical lens of the third optical member 13, it is preferable to use a flat plate type cylindrical lens including a plurality of lenses that are formed on the parallel straight line by dividing a curved lens, such as a Fresnel lens, into parallel regions.

Next, a three-dimensional image projection method using the three-dimensional image projector 1C of the fourth embodiment will be described. The image projector 1C is different from the image projector 1A only in that the conversion optical system 10B includes the third optical member 13 that is a cylindrical lens. That is, the image projector 1C is different from the image projector 1A only in that the image light L converges only in a third direction C6 on the image projection unit 30A. Therefore, as a three-dimensional image projection method using the three-dimensional image projector 1C, it is possible to use the three-dimensional image projection method described in detail in the first embodiment. More specifically, in the selection step S3 (refer to FIGS. 5 and 7), when generating the image light L whose direction is converted by the image projection unit 30A, an image corresponding to the eye direction of the viewer V who views the three-dimensional image 35 from the top surface 31p side of the base 31 is selected.

Figure 19:
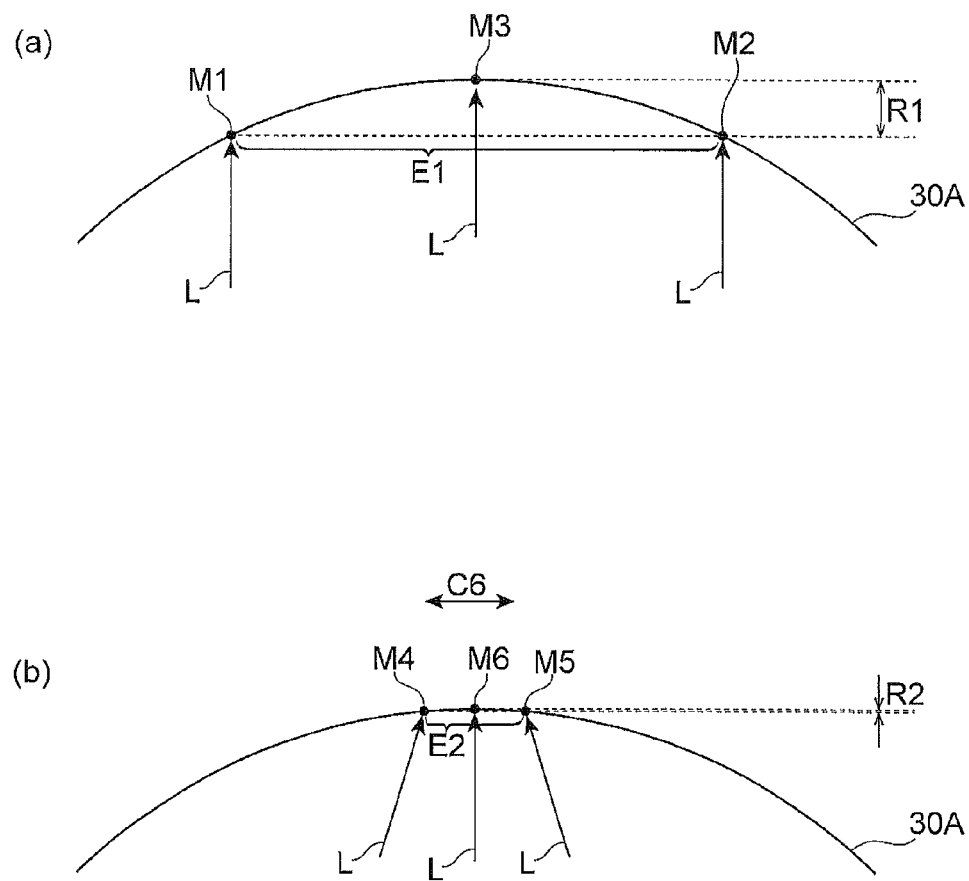
FIG. 19 is a diagram for explaining the effect of the three-dimensional image projector shown in FIG. 17.

The operations and effects of the conversion optical system 10A of the first embodiment that does not include the third optical member 13 and the operations and effects of the conversion optical system 10B including the third optical member 13 will be described while being compared with each other. FIG. 19(a) is a diagram for explaining the operations and effects of the conversion optical system 10A of the first embodiment that does not include the third optical member 13. As shown in FIG. 19(a), the image light L is emitted to the image projection unit 30A. Accordingly, the image light L is emitted to a range E1 including endpoints M1 and M2 and a midpoint M3 on the image projection unit 30A. When the image projection unit 30A has a shape that is curved so as to surround the rotation axis RA, a distance difference R1 occurs between a distance until the image light L emitted from the conversion optical system 10A reaches the endpoints M1 and M2 and a distance until the image light L emitted from the conversion optical system 10A reaches the midpoint M3. That is, since the image projection unit 30A is curved, the image light L near the center needs to travel longer than the image light L near the end by the distance difference R1. When the distance difference R1 is large, distortion may occur in the three-dimensional image 35 that is reproduced.

FIG. 19(b) is a diagram for explaining the operations and effects of the conversion optical system 10B of the fourth embodiment including the third optical member 13. As shown in FIG. 19(b), the image light L emitted from the conversion optical system 10B of the fourth embodiment converges in the third direction C6. Accordingly, the image light L is emitted to a range E2 including endpoints M4 and M5 and a midpoint M6 on the image projection unit 30A. The range E2 is narrower than the range E1 of the first embodiment. For this reason, it is possible to reduce a distance difference R2 between a distance until the image light L emitted from the conversion optical system 10B reaches the endpoints M4 and M5 and a distance until the image light L emitted from the conversion optical system 10B reaches the midpoint M6. Therefore, it is possible to suppress the distortion of the three-dimensional image 35 that is reproduced.

The conversion optical system 10B including the third optical member 13 can be applied to all of the three-dimensional image projector 1A of the first embodiment, the three-dimensional image projector 1B of the second embodiment, and the three-dimensional image projector of the third embodiment.

In addition, the configuration to suppress the distortion of a three-dimensional image due to the curvature of the image projection unit 30A is not limited to the configuration including the third optical member 13. For example, image light distorted in advance may be emitted from the conversion optical system 10A so that an image is projected without distortion occurring when the image light L is projected on the curved image projection unit 30A. For example, a matrix showing the distortion is calculated, and image data is multiplied by the inverse matrix of the matrix. By this method, it is possible to obtain image data that is correctly displayed on the curved image projection unit 30A.

In addition, the embodiment described above shows examples of the three-dimensional image projectors 1A to 1C, the three-dimensional image projection method, and the three-dimensional image projection systems 100A to 100C.

The three-dimensional image projectors 1A to 1C, the three-dimensional image projection method, and the three-dimensional image projection systems 100A to 100C are not limited to the embodiment described above. The three-dimensional image projectors 1A to 1C, the three-dimensional image projection method, and the three-dimensional image projection systems 100A to 100C may be modified or may be applied to others within the scope without departing from the subject matter defined by the appended claims.

Although the Fresnel lens is used as the second optical member 12, the second optical member 12 is not limited thereto. As the second optical member 12, it is also possible to use an optical member that is different from the Fresnel lens capable of converting the image light L into parallel light. For example, it is possible to manufacture and use a hologram having a function of the second optical member 12.

Although the linear prism plate is used as the first optical member 11, the first optical member 11 is not limited thereto. As the first optical member 11, it is also possible to use an optical member that is different from the linear prism plate capable of converting the traveling direction of the image light L into a predetermined direction. For example, it is possible to manufacture and use a hologram having a function of the first optical member 11.

Although the lenticular lens is used as the diffusion plate 33, the diffusion plate 33 is not limited thereto. As the diffusion plate 33, it is also possible to use an optical member that is different from the lenticular lens capable of converting the projection image light L into a predetermined direction. For example, a prism plate having a small prism pitch may be used.

Figure 20:
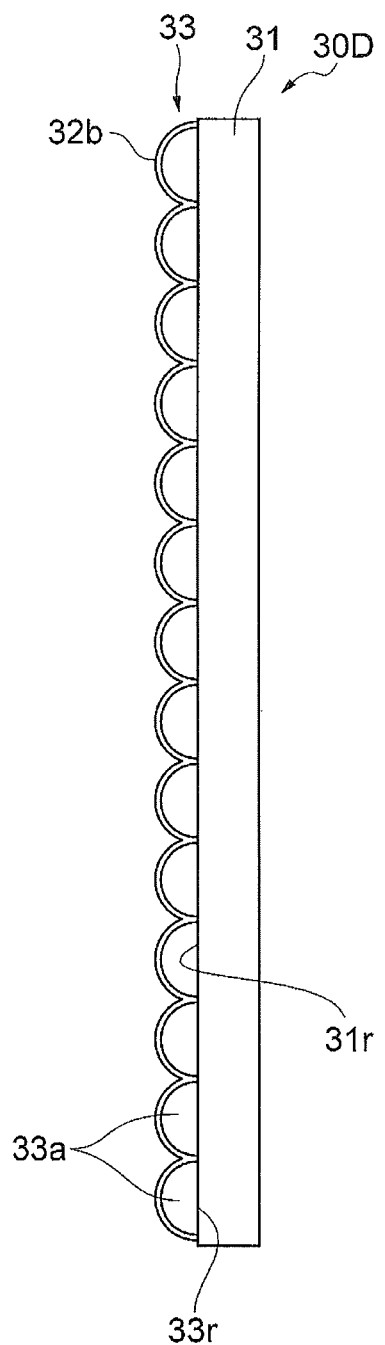
FIG. 20 is a diagram for explaining a modification of the image projection unit of the first embodiment.

The image projection unit 30A may be an image projection unit 30D having a configuration shown in FIG. 20. In the image projection unit 30D, a lenticular lens 33 including a plurality of cylindrical lenses 33a is bonded onto the bottom surface 31r of the base 31. In the image projection unit 30D, the non-lens surface 33r of the lenticular lens 33 is bonded so as to face the bottom surface 31r of the base 31. In addition, the reflection plate 32b is provided on the lens surface 33p of the lenticular lens 33. Such a reflection plate 32b can be formed by vapor deposition of aluminum. In addition, the base 31 and the lenticular lens 33 may be integrally formed. In addition, the image light L may be irradiated from the lenticular lens 33 side.

The three-dimensional image projectors 1A to 1C project the image light L, which is emitted from the image light emission unit 3 including the projector 3b, to the image projection units 30A to 30D. Image light projected to the image projection units 30A to 30D is not limited to this. Image light may be generated by making laser light, which is light having directivity, incident on a medium on which a hologram is recorded, for example.

In the three-dimensional image projectors 1A to 1C, the image generation unit 2 and the image light emission unit 3 including the projector 3b are disposed vertically below the image projection unit (screen) 30. The conversion optical systems 10A and 10B and the rotary driving unit 20 are disposed vertically below the image projection units 30A to 30D. The three-dimensional image projector is not limited to this arrangement. The image generation unit 2, the image light emission unit 3, the conversion optical systems 10A and 10B, and the rotary driving unit 20 may be disposed vertically above the image projection units 30A to 30D. For example, the image generation unit 2, the image light emission unit 3, the conversion optical systems 10A and 10B, and the rotary driving unit 20 may be disposed on the ceiling, and the image light L may be projected from the projector 3b to the image projection units 30A to 30D through the conversion optical systems 10A and 10B.

As the first optical member 11, the second optical member 12, and the third optical member 13, holograms having these functions may be manufactured and used. Alternatively, a composite function thereof may be used by manufacturing one hologram by multiple exposure.

In addition, the first optical member 11, the second optical member 12, and the third optical member 13 may be manufactured as reflection type holograms to control the traveling direction of light. In this case, the image light emission unit 3 is disposed vertically above the image projection units 30A to 30D, and the conversion optical systems 10A and 10B and the rotary driving unit 20 are disposed vertically below the image projection units 30A to 30D. Alternatively, the image light emission unit 3 may be disposed vertically below the image projection units 30A to 30D, and the conversion optical systems 10A and 10B and the rotary driving unit 20 may be disposed vertically above the image projection units 30A to 30D.

In the three-dimensional image projectors 1A to 1C, the conversion optical systems 10A and 10B are disposed such that the optical axis AL of the three-dimensional image projectors 1A to 1C is along the vertical direction. However, the three-dimensional image projectors are not limited to this arrangement. The conversion optical systems 10A and 10B of the three-dimensional image projectors 1A to 1C may be disposed in a direction in which the optical axis AL of the conversion optical systems 10A and 10B crosses the vertical direction.

For example, the conversion optical systems 10A and 10B may be disposed such that that optical axis AL is along the horizontal direction. In this case, the image projection units 30A to 30D are disposed so as to have a shape curved in a direction perpendicular to the rotation axis RA along the horizontal direction.

The three-dimensional image projectors 1A to 1C may be used to project a three-dimensional image on the dashboard of a vehicle. In this case, image light is emitted from an image projection unit and an image generation unit embedded in the dashboard, and a three-dimensional image is projected by the image projection unit disposed on the dashboard. In this case, a windshield may be used as a base of the image projection unit. In this case, a reflection plate and a diffusion plate are formed on the windshield. In addition, an optical sheet having a diffraction grating is bonded to the windshield.

The three-dimensional image projectors 1A to 1C may be used to project a three-dimensional image onto the stage or screen of an exhibition hall, a movie theater, a theater, or the like. By providing this, it is possible to configure a product having three-dimensional image display as a value added.

INDUSTRIAL APPLICABILITY

According to the present invention, the three-dimensional image projector, the three-dimensional image projection method, and the three-dimensional image projection systems 100A to 100C, in which a region where a three-dimensional image can be viewed is extended, are provided.

REFERENCE SIGNS LIST 1A to 1C: three-dimensional image projector
2: image generation unit
3: image light emission unit 3a: control unit
3b: projector
4: mirror
10A, 10B: conversion optical system
11 to 13: optical member
11a: rotation reference member
12p: incidence surface
12r: emission surface
20: rotary driving unit
21: control board
22: servo amplifier
23: rotary driving mechanism
24: encoder
30A to 30D: image projection unit
31: base
32: reflection plate
33: diffusion plate (lenticular lens)
36, 38: optical sheet
100A to 100C: three-dimensional image projection system

The invention claimed is:

1. A three-dimensional image projector, comprising:
a conversion optical system including a plate-shaped first optical member that has an incidence surface, on which image light is incident, and an emission surface, which is located on an opposite side of the incidence surface, and that converts a traveling direction of the image light so as to form a predetermined angle between the emission surface and an emission direction of the image light on the emission surface;
a rotary driving unit that drives the conversion optical system so as to rotate along the emission surface with a predetermined point on the emission surface as a center of rotation; and
an image projection unit that is erected along a rotation axis including the center of rotation, converts the traveling direction of the image light emitted from the conversion optical system into a first direction along a surface crossing the rotation axis, and diffuses the image light emitted from the conversion optical system in a second direction along the rotation axis.

2. The three-dimensional image projector according to claim 1,
wherein the image projection unit includes a diffraction grating.

3. The three-dimensional image projector according to claim 2,
wherein the image projection unit is a reflection type hologram including the diffraction grating.

4. The three-dimensional image projector according to claim 2,
wherein the image projection unit is a transmission type hologram including the diffraction grating.

5. The three-dimensional image projector according to claim 1,
wherein the image projection unit includes a reflection plate that reflects the image light in the first direction and a diffusion plate that diffuses the image light in the second direction, and
the reflection plate and the diffusion plate are stacked.

6. The three-dimensional image projector according to claim 5,
wherein the diffusion plate is a lenticular lens including a plurality of cylindrical lenses.

7. The three-dimensional image projector according to claim 6,
wherein the reflection plate is provided on a lens surface of the diffusion plate.

8. The three-dimensional image projector according to claim 1,
wherein the conversion optical system further includes a second optical member, and
the second optical member converts the image light into parallel light and emits the image light, which has been converted into the parallel light, to the incidence surface of the first optical member.

9. The three-dimensional image projector according to claim 1,
wherein the conversion optical system further includes a third optical member,
the third optical member emits the image light, which converges in a third direction, to the image projection unit, and
the third direction is a direction along a surface perpendicular to the rotation axis, and is a direction perpendicular to the emission direction on the emission surface of the first optical member.

10. The three-dimensional image projector according to claim 1,
wherein the image projection unit has a shape curved in a direction perpendicular to the rotation axis.

11. The three-dimensional image projector according to claim 1,
wherein the conversion optical system includes a diffraction grating.

12. A three-dimensional image projection method of acquiring a three-dimensional image by projecting image light to an image projection unit from a conversion optical system driven to rotate by a rotary driving unit, the method comprising:
a division step of forming divided images by dividing each of a plurality of original images, which are obtained by changing a viewing point with respect to an object to different positions, along one direction of the original image;
a selection step of selecting the divided images from the plurality of divided images based on a rotation angle of the conversion optical system and a position of the image light, which is projected to the image projection unit, in the image projection unit;
a combination step of generating a projection image for generating the image light by combining the selected divided images; and
a projection step of generating the image light projecting the projection image and projecting the image light to the image projection unit through the conversion optical system,
wherein in the projection step, the image light is emitted to the conversion optical system from an image light emission unit that emits the image light continuously in a form of a pulse, a traveling direction of the image light is converted by the conversion optical system that includes a plate-shaped optical member having an incidence surface, on which the image light is incident, and an emission surface, which is located on an opposite side of the incidence surface, and that converts the traveling direction of the image light so as to form a predetermined angle between the emission surface and an emission direction of the image light on the emission surface, the conversion optical system is driven to rotate along the emission surface with a predetermined point on the emission surface as a center of rotation, and the image light is emitted to the image projection unit that is erected along a rotation axis including the center of rotation, converts the traveling direction of the image light emitted from the conversion optical system into a first direction along a surface crossing the rotation axis, and diffuses the image light emitted from the conversion optical system in a second direction along the rotation axis.

13. The three-dimensional image projection method according to claim 12,
wherein, in the image projection unit, a reflection plate that reflects the image light emitted from the conversion optical system and a diffusion plate that diffuses the image light in one direction are stacked.

14. A three-dimensional image projection system, comprising:
an image generation unit that generates a projection image using a plurality of original images obtained by changing a viewing point with respect to an object to different positions;
an image light emission unit that emits image light projecting the projection image continuously in a form of a pulse;
a conversion optical system that includes a plate-shaped optical member having an incidence surface, on which the image light is incident, and an emission surface, which is located on an opposite side of the incidence surface, and that converts a traveling direction of the image light so as to form a predetermined angle between the emission surface and an emission direction of the image light on the emission surface;
a rotary driving unit that drives the conversion optical system so as to rotate along the emission surface with a predetermined point on the emission surface as a center of rotation; and
an image projection unit that is erected along a rotation axis including the center of rotation, converts the traveling direction of the image light emitted from the conversion optical system into a first direction along a surface crossing the rotation axis, and diffuses the image light emitted from the conversion optical system in a second direction along the rotation axis,
wherein the projection image is formed by a plurality of divided images obtained by dividing each of the original images along one direction of the original image, and
the divided images are selected based on a rotation angle of the conversion optical system and a position of the image light, which is projected to the image projection unit, in the image projection unit.

15. The three-dimensional image projection system according to claim 14,
wherein, in the image projection unit, a reflection plate that reflects the image light emitted from the conversion optical system and a diffusion plate that diffuses the image light in one direction are stacked.

* * * * *